US005409669A

United States Patent [19]
Smith et al.

[11] Patent Number: 5,409,669
[45] Date of Patent: Apr. 25, 1995

[54] ELECTRICALLY REGENERABLE DIESEL PARTICULATE FILTER CARTRIDGE AND FILTER

[75] Inventors: Mark P. Smith, Lino Lakes, Minn.; Richard L. Bloom, Woodville, Wis.; Thomas J. Conway, Little Canada, Minn.

[73] Assignee: Minnesota Mining and Manufacturing Company, St. Paul, Minn.

[21] Appl. No.: 168,985

[22] Filed: Dec. 17, 1993

Related U.S. Application Data

[63] Continuation of Ser. No. 8,174, Jan. 25, 1993, abandoned.

[51] Int. Cl.$^6$ ............................ F01N 3/02; B01D 53/34
[52] U.S. Cl. ..................................... 422/174; 422/179; 422/173; 422/198; 422/199; 60/303; 60/300; 55/267; 55/523; 55/DIG. 10; 55/DIG. 30; 219/535
[58] Field of Search ................ 422/173, 198, 174, 179, 422/199; 55/267, 269, 523, 466, DIG. 10, DIG. 30; 60/303, 311, 300; 219/548, 205, 534–535, 546, 549

[56] References Cited

U.S. PATENT DOCUMENTS

| | | | |
|---|---|---|---|
| 3,099,540 | 7/1963 | Eisler | 219/549 |
| 3,869,267 | 3/1975 | Gaylor | 55/492 |
| 3,920,428 | 11/1975 | Kinsley, Jr. | 55/528 |
| 4,181,514 | 1/1980 | Lefkowitz et al. | 55/528 |
| 4,220,625 | 9/1980 | Toh et al. | 422/177 |
| 4,264,346 | 4/1981 | Mann | 55/523 |
| 4,276,071 | 6/1981 | Outland | 55/523 |
| 4,324,572 | 4/1982 | Erdmannsdörfer et al. | 55/385 |
| 4,376,637 | 3/1983 | Yang | 55/2 |
| 4,427,418 | 1/1984 | Kogiso et al. | 55/287 |
| 4,456,457 | 6/1984 | Nozawa et al. | 55/283 |
| 4,535,589 | 8/1985 | Yoshida et al. | 219/205 |
| 4,543,113 | 9/1985 | Forester et al. | 55/378 |
| 4,576,799 | 3/1986 | Wörner et al. | 422/176 |
| 4,613,350 | 9/1986 | Forester et al. | 65/2 |
| 4,744,216 | 5/1988 | Rao et al. | 422/174 |
| 4,792,662 | 12/1988 | Kitagaki et al. | 219/548 |
| 4,813,231 | 3/1989 | Bykowski | 60/274 |
| 4,940,476 | 7/1990 | Buck | 55/DIG. 30 |
| 5,015,986 | 5/1991 | Uchida et al. | 219/548 |
| 5,042,249 | 8/1991 | Erdmannsdoerfer | 60/311 |
| 5,171,341 | 12/1992 | Merry | 422/174 |
| 5,174,968 | 12/1992 | Whittenberger | 422/174 |
| 5,174,969 | 12/1992 | Fischer et al. | 422/177 |
| 5,180,409 | 1/1993 | Fischer | 55/DIG. 30 |
| 5,224,973 | 7/1993 | Hoppenstedt et al. | 55/267 |
| 5,258,164 | 11/1993 | Bloom et al. | 422/180 |
| 5,293,742 | 3/1994 | Gillingham et al. | 60/311 |

FOREIGN PATENT DOCUMENTS

| | | | |
|---|---|---|---|
| 0275372A1 | 7/1988 | European Pat. Off. | F01N 3/02 |
| 0358522A3 | 3/1990 | European Pat. Off. | F01N 3/02 |
| 0543075 | 5/1993 | European Pat. Off. | F01N 3/02 |
| 3545762A1 | 7/1987 | Germany | F01N 3/02 |

(List continued on next page.)

OTHER PUBLICATIONS

Sales Brochure entitled "Filter Cartridge Sealing Systems," from Filterite (a Brunswick Corporation) of Timonium, Md., Bulletin No. 1795.

SAE Technical Paper Series, 870015, entitled "Experiences in the Development of Ceramic Fiber Coil Particulate Traps," 1987, H. O. Hardenberg and H. L. Daudel, pp. 67–78.

SAE Technical Paper Series, 870011, entitled "Urban Bus Application of a Ceramic Fiber Coil Particulate Trap," 1987, H. O. Hardenberg, pp. 17–26.

Japanese Abstract No. 56-46405 (Sumiyoshi), published Oct. 7, 1982.

Primary Examiner—Robert J. Warden
Assistant Examiner—Hien Tran
Attorney, Agent, or Firm—Gary L. Griswold; Walter N. Kirn; Gregory D. Allen

[57] ABSTRACT

An electrically regenerable diesel particulate filter cartridge and filter comprising a slotted electrically resistive tube which, when energized, heats the filter media to a temperature sufficient to allow the trapped soot particulates to burn.

36 Claims, 12 Drawing Sheets

FOREIGN PATENT DOCUMENTS

| | | | |
|---|---|---|---|
| 3731766A1 | 3/1989 | Germany | B01D 39/20 |
| 3828516C1 | 3/1989 | Germany | B01D 46/48 |
| 3800723A1 | 7/1989 | Germany | F01N 3/02 |
| 3801634A1 | 8/1989 | Germany | B01D 53/36 |
| 3806131C2 | 8/1989 | Germany | B01D 39/20 |
| 3910554A1 | 10/1989 | Germany | B01D 46/24 |
| 3823205A1 | 1/1990 | Germany | F01N 3/02 |
| 2193656A | 2/1988 | United Kingdom | F01N 3/02 |
| WO92/00442 | 1/1992 | WIPO | F01N 3/02 |
| WO92/17689 | 10/1992 | WIPO | F01N 3/02 |
| WO92/17691 | 10/1992 | WIPO | F01N 3/02 |
| WO93/00503 | 1/1993 | WIPO | F01N 3/02 |

ELECTRICALLY REGENERABLE DIESEL PARTICULATE FILTER CARTRIDGE AND FILTER

This is a continuation of application Ser. No. 08/008,174 filed Jan. 25, 1993, now abandoned.

FIELD OF THE INVENTION

This invention relates to electrically regenerable diesel particulate filter cartridges and filters.

DESCRIPTION OF THE RELATED ART

Diesel engines emit a hazardous, sooty exhaust gas that can be rendered less hazardous by using diesel particulate filters which remove at least a portion of the soot from exhaust gas. The soot trapped by such filters builds up over time, requiring periodic regeneration (i.e., removal of the entrapped soot).

There are several techniques known in the art for regenerating diesel particulate filters. For example, one technique involves the use of a gas burner to periodically burn entrapped soot from the filter media.

Another technique involves the use of catalytic materials coated onto the filter media. A third technique employs fuel having catalytic additives that lower the oxidation temperature of the soot.

A fourth technique utilizes electrical heating elements in contact with the filtering media. Examples of electrical heating element configurations known to be useful for regenerating diesel particulate filter cartridges include tubes formed from expanded metal (FIG. 1, 110) and slotted sheet material (FIG. 2, 120). Problems associated with expanded metal include difficulty in controlling tolerances during manufacture (i.e., the desired resistance of each path length) and the presence of stress concentrations at the intersection of strands which tend to provide initiation points for cracks. A problem associated with the tube form of the slotted sheet configuration shown in FIG. 2 is that as a result of temperature cycling and the corresponding thermal expansions and contractions, the strands of the heating element tend to buckle radially. Such buckling produces stress concentrations in the heating element which provide initiation points for cracks; penetration of the heating element into the filter media which may damage or interfere with the filtering function; or separation of portions of the heating element from the filter media, resulting in (a) nonuniform heat dissipation throughout the filter media (b) undesirable localized hot spots in the heater element, and (c) decreased soot combustion because of loss of heat conduction transfer to the soot particles. Further, such a heating element may buckle radially upon itself, causing the heating element to short circuit.

SUMMARY OF THE INVENTION

The present invention provides a first diesel particulate filter cartridge comprising:
(a) a substantially rigid, (slotted) electrically resistive tube having two ends and an outer slotted surface having a plurality of slots, the electrically resistive tube having a length and a circumference, a current path length across the length of the electrically resistive tube which is longer than the length of the electrically resistive tube, and current path lengths around the circumference of the electrically resistive tube having portions bounded on opposite sides by slots, wherein all of the current path lengths having the bounded portions are greater in length than the circumference of the electrically resistive tube, the electrically resistive tube being positioned such that when a voltage is applied across the electrically resistive tube, sufficient heat is transferred from the electrically resistive tube to the filtering element to burn off entrapped diesel exhaust particulate, the electrically resistive tube having a circumferential stiffness less than 40 percent of the circumferential stiffness of a comparable electrically resistive hollow, solid tube;
(b) a filtering element comprising inorganic fiber (preferably inorganic yarn) covering the outer slotted surface of the electrically resistive tube; and
(c) means for applying a voltage across the electrically resistive tube to heat it above the combustion point of entrapped diesel exhaust particulate.

Preferably, the first filter cartridge further comprises means for supporting the cartridge in a casing.

In another aspect, the present invention provides a diesel particulate filter or trap comprising
(a) a casing having at least two ends;
(b) means for connecting the at least two ends of the casing to an exhaust system;
(c) means for supporting at least one diesel particulate filter cartridge; and
(d) at least one first diesel particulate filter cartridge, wherein the two ends of the electrically resistive tube extend between the at least two ends of the casing and wherein the at least one diesel particulate filter cartridge is supported in the casing by the supporting means.

In another aspect, the present invention provides a second diesel particulate filter cartridge comprising:
(a) a substantially rigid, hollow tubular support member having an outer surface with a plurality of openings and two ends;
(b) a filtering element comprising inorganic fiber (preferably inorganic yarn) covering the openings in the outer surface of the hollow tubular support member;
(c) a slotted electrically resistive tube, the slotted electrically resistive tube having a plurality of slots, a length, and a circumference, a current path length across the length of the slotted electrically resistive tube which is longer than the length of the slotted electrically resistive tube, and current path lengths around the circumference of the slotted electrically resistive tube having portions bounded on opposite sides by slots, wherein all of the current path lengths having the bounded portions are greater in length than the circumference of the slotted electrically resistive tube, the slotted electrically resistive tube being positioned such that when a voltage is applied across the slotted electrically resistive tube, sufficient heat is transferred from the slotted electrically resistive tube to the filtering element to burn off entrapped diesel exhaust particulate, the electrically resistive tube having a circumferential stiffness less than 40 percent of the circumferential stiffness of a comparable electrically resistive hollow, solid tube; and
(d) means for applying a voltage across the slotted electrically resistive tube to heat it above the combustion point of entrapped diesel exhaust particulate.

The slotted electrically resistive tube of the second diesel particulate filter cartridge covers the exterior surface of the filter element, is buried or sandwiched within the filter element, or a combination thereof.

To provide uniform heating, at least one face of the electrically resistive tube is preferably in intimate contact with the filter element. If the electrically resistive tube is buried in the filter element, preferably substantially the entire area of each major surface of the electrically resistive tube (i.e., the inner and outer surfaces) is in contact with the filter element. Further, the heat-insulating nature of the filtering element tends to confine the heat, minimizing the energy required to burn off the entrapped soot particles.

Preferably, the electrically resistive tube is positioned such that it is located near the region of maximum soot collection.

Preferably, the second filter cartridge further comprises means for supporting the cartridge in a casing.

In yet another aspect, the present invention provides a diesel particulate filter or trap comprising
(a) a casing having at least two ends;
(b) means for connecting the at least two ends of the casing to an exhaust system;
(c) means for supporting at least one diesel particulate filter cartridge; and
(d) at least one second diesel particulate filter cartridge, wherein the two ends of the hollow, tubular support member extend between the at least two ends of the casing and is supported in the casing by the means for supporting.

In this application:

"substantially rigid" as used herein means the tube or support member is self supporting and is capable of supporting the filter media covering the outer surface thereof;

"slotted tube" as used herein refers to a hollow cylinder which can be circular or elliptical (preferably, circular) wherein the slots are provided by conventional processing techniques (other than expanded metal forming techniques, wherein sheet metal is slit and then expanded to form a mesh) including punching, stamping, laser cutting, water jet cutting, and plasma cutting;

"strand" with regard to the heating element refers to a solid strip of material having two opposite sides, wherein each opposite point along the two opposite sides are typically parallel; for example, a strand in the heating element configuration 120 depicted in FIG. 2 is represented by shaded area 121; a strand in the heating element configuration 130 depicted in FIG. 3 is represented by shaded area 131;

"current path length" as used herein refers to the shortest electrical current path between two points; for example, the current path across the length of a tube formed from the configuration depicted in FIG. 3, wherein the length of the tube is in the x-direction, is shown by line 132; further, the circumferential current path length of a tube formed from the configuration depicted in FIG. 3 is shown by line 133;

"buckling" as used herein refers to a sudden, significant deformation of a structure resulting from a slight increase of an existing load under which the structure had exhibited little, if any, deformation prior to increasing the load; for example, a yardstick placed on end is typically able to support a load of several kilograms without significant lateral deformation, but if the load is increased until the yardstick bows out slightly, any further increase in the load will result in large lateral deflections; more specifically, buckling occurs when the load applied, $P_{App}$, to a strand of a heating element is greater than the critical load, $P_{Cr}$, wherein the critical load is defined by $$P_{Cr} = \frac{\Pi^2 E b t^3}{3 l^2},$$

wherein
E is the Young's modulus of the strand material;
b is the width of the strand;
t is the thickness of the strand; and
l is the length of the strand before a load is applied;

"inorganic fiber" refers to any inorganic-based fiber which is resistant to high temperature (e.g., temperatures above about 600° C.), is chemically resistant to diesel exhaust gas, and has textile qualities (i.e., is suitable for the winding, weaving, etc., required to make a filter element);

"yarn" means a plurality or bundle of individual fibers or filaments;

"heat-fugitive fiber" refers to a fiber comprising constituents which decompose and volatilize when heated (e.g., organic material); and "fiber segment" refers to the portion of a broken fiber protruding from the core of the yarn.

The present invention provides an efficient, economical means for regenerating (i.e., burning out the collected soot) a diesel particulate filter cartridge.

BRIEF DESCRIPTION OF THE DRAWING

The invention may be more easily understood in reference to the drawing. In the drawing.

DESCRIPTION OF THE PREFERRED EMBODIMENTS

Figure 9:
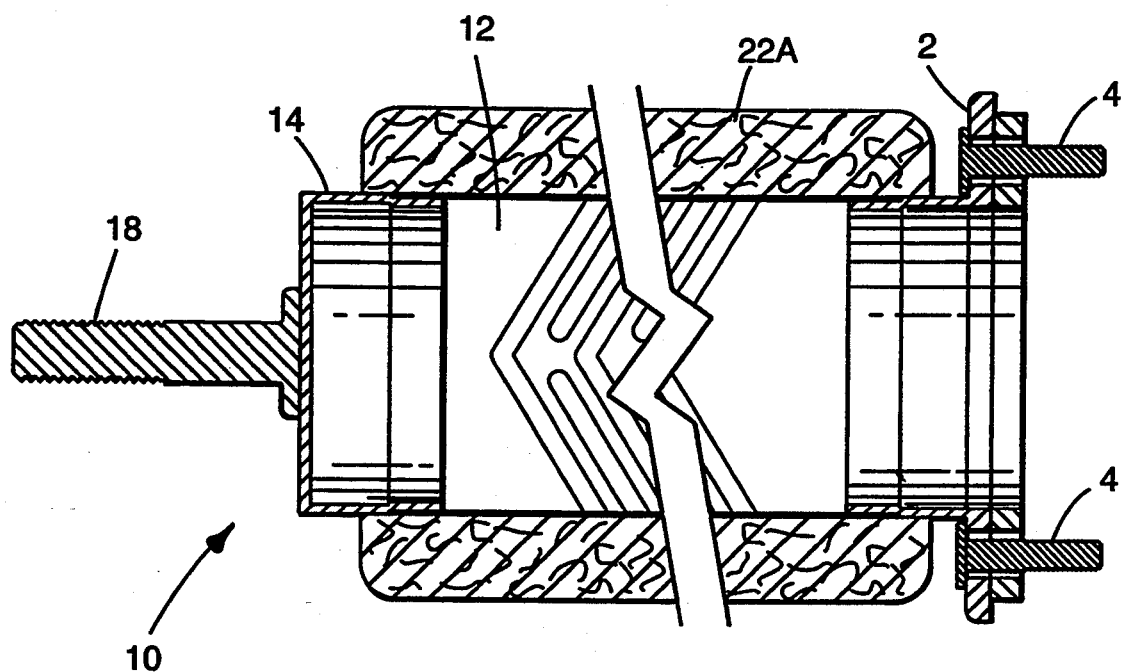
FIG. 9 is a longitudinal cross-section of a preferred first diesel particulate filter cartridge according to the invention.

Referring to FIG. 9, a preferred first diesel particulate filter cartridge according to the present invention 10 comprises slotted electrically resistive tube 12 having welded circular metal cap 14 and metal annular ring 2. Threaded metal post 18 is welded to circular metal cap 14. Welded to metal annular ring 16 are four metal mounting studs 4. Threaded metal post 18 is connected to a conventional switch (not shown) which is in turn connected to a conventional power source (not shown). Metal mounting studs 4 provide an electrical ground for the circuit. Filter media 22A comprises inorganic yarn that is substantially helically cross-wound around slotted electrically resistive tube 12.

Figure 10:
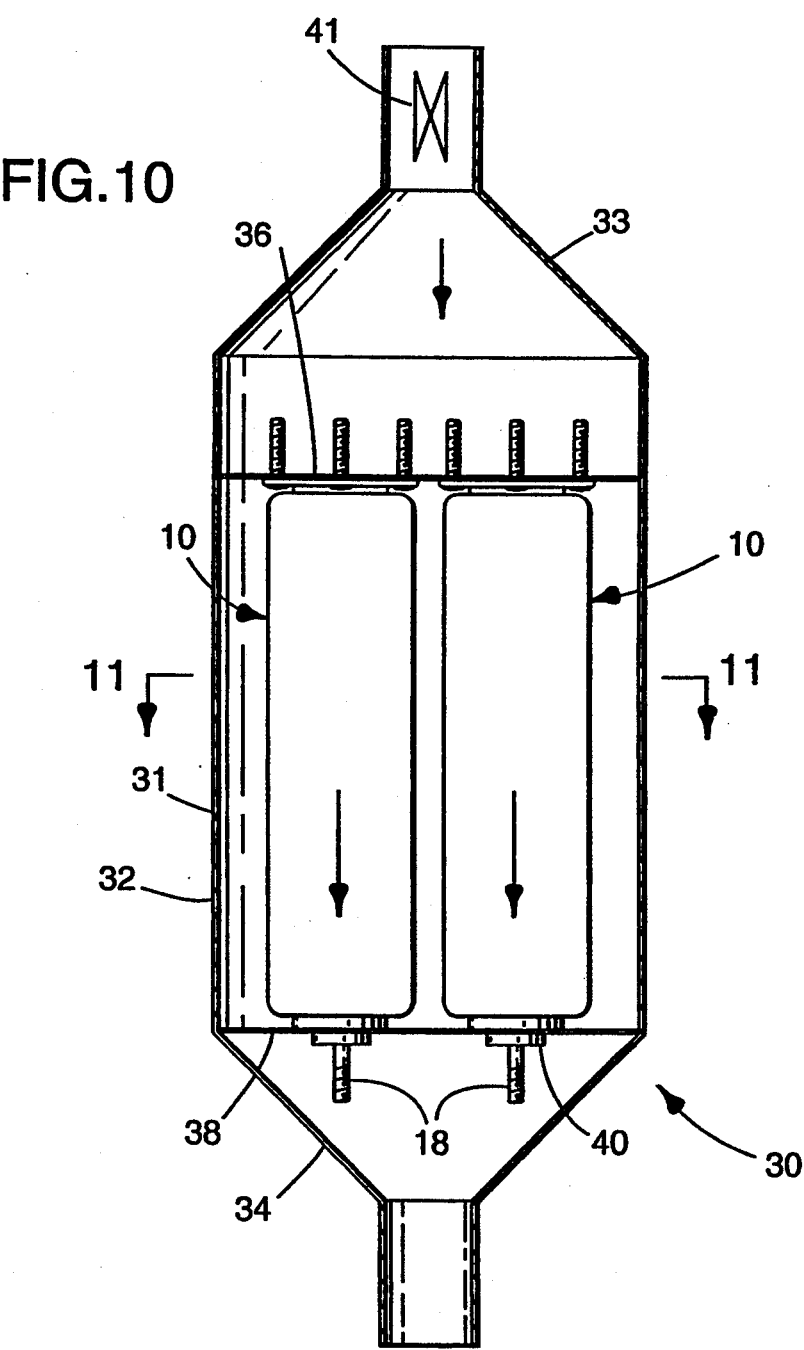
FIG. 10 a longitudinal cross-section of a diesel particulate filter or trap according to the present invention.
Figure 11:
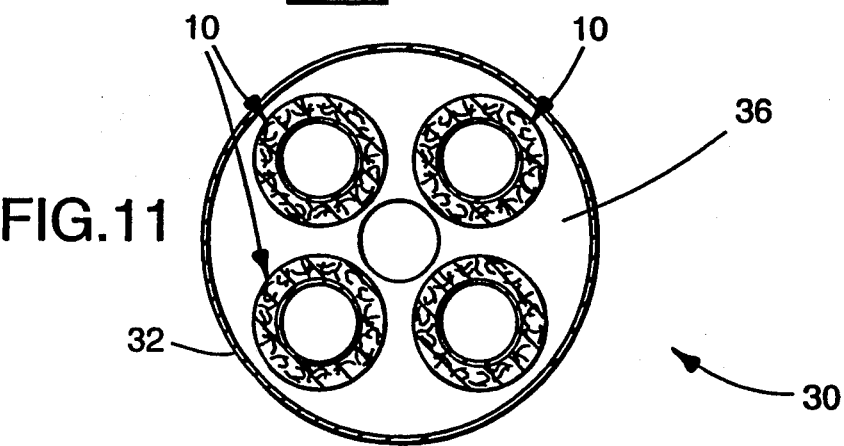
FIG. 11 is a cross-section along line 11—11 of FIG. 10.

A preferred diesel particulate filter or trap according to the present invention is shown in FIGS. 10 and 11. Diesel particulate filter or trap 30 comprises elongated casing 31 having cylindrical body 32, conical exhaust inlet 33, and conical exhaust outlet 34. Within cylindrical body 32, and extending between the inlet and outlet ends, are four spaced, substantially parallel diesel particulate filter cartridges 10. Each filter cartridge 10 is mounted to circular metal plate 36 which has a circular opening to allow exhaust gas to pass radially inward and exit outwardly through filter cartridge 10 and exit filter 30 through conical exhaust outlet 34. Threaded metal post 18 supported by open support structure 38 is insulated from open support structure 38 by ceramic insulator 40. Metal blocking valve 41 is positioned in conical inlet 33 to divert exhaust gas flow from filter cartridge 10 during regeneration, thereby reducing the power requirements.

To minimize the amount of electrical power expended at any instant in time, a diesel particulate trap comprising a plurality of filter cartridges preferably includes means for independently energizing each of the electrically resistive tubes at different times (e.g., sequentially).

Figure 12:
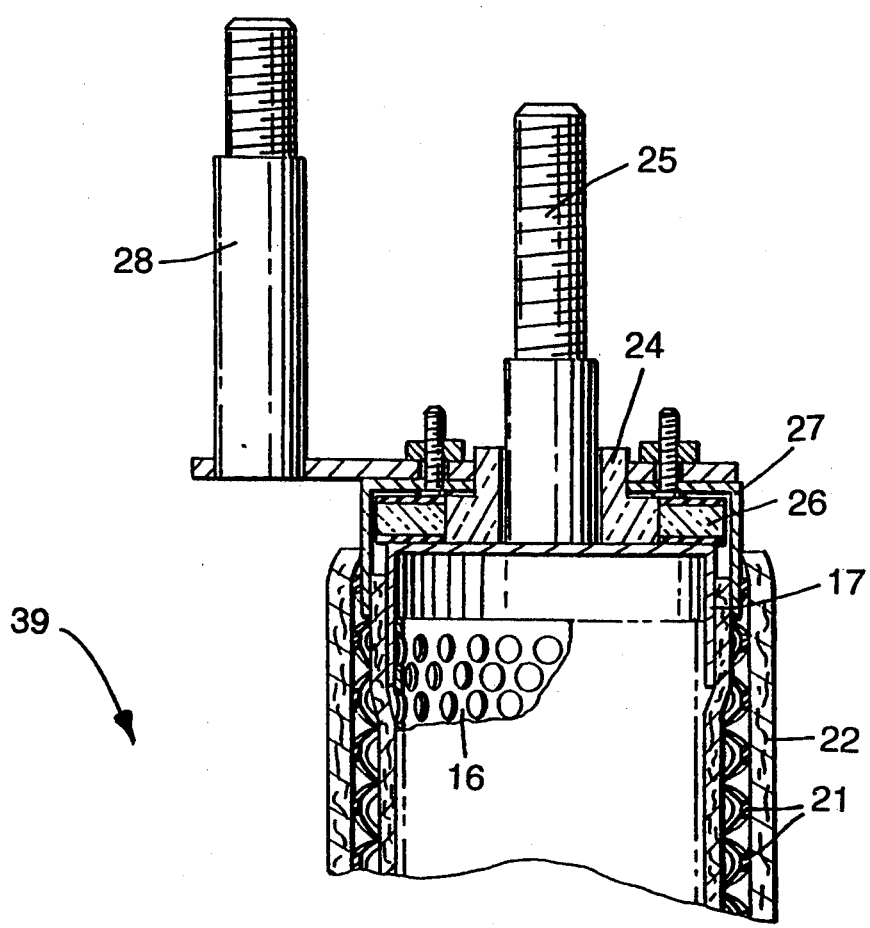
FIG. 12 is a longitudinal cross-section of a preferred second diesel particulate filter cartridge according to the invention.
Figure 12:
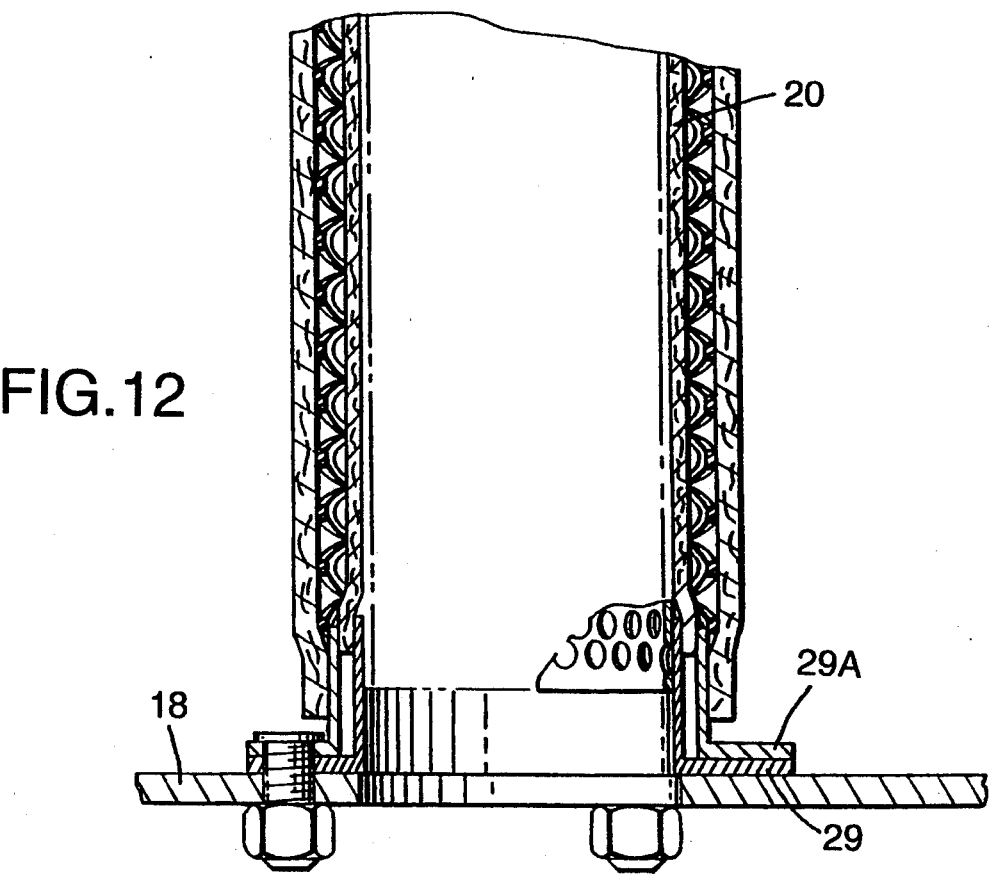

Referring to FIG. 12, a preferred second diesel particulate filter cartridge according to the present invention 39 comprises tubular support member 16 having an outer surface with openings extending from the outer surface to an inner surface covered by inner filtering element 20 which is in turn covered by slotted electrically resistive tube 21, which in turn is covered by outer filtering element 22.

Cap 17 is covered by annular electrical insulator 24 which has an axial bore for support stud 25 that is integral with cap 17. Fitted around insulator 24 is electrical insulated annular washer 26 comprised of coated inorganic yarns. The end of slotted electrically resistive tube 21 is connected to annular collar 27, which is electrically connected to electrical post 28. Electrical post 28 can be connected to a conventional switch (not shown) leading to a conventional power source (not shown).

The open end of tubular support member 16 fits into first annular collar 29, and inner filtering element 20 extends over the imperforate area provided by that collar. The adjacent end of slotted electrically resistive tube 21 is connected to a second annular collar 29A, and outer filtering element 22 extends over that collar.

The casing, plates, and posts can independently comprise any suitable material including, for example, metals or ceramics, although metal is preferred, for example, if the casing, plate, or post is to serve as an electrical conductor. Further, for ease of manufacture, the preferred material is a metal. Preferably, the metal is stainless steel. Means for connecting the casing, plates, and posts include those known in the art for the particular material of which the casing, plates, and posts are comprised. For example, if the casing, plates, and posts are made of metal, the preferred means for connecting them is welding.

The shape of the casing can vary by convenience. Suitable shapes include those having a circular cross-section, an elliptical cross-section, a square cross-section, and a rectangular cross-section. The casing typically is elongated to allow it to have a slim profile.

The hollow support member can comprise any suitable material including, for example, metals and ceramics. The hollow support member can be, for example, a tube with holes, a wire screen, or an expanded metal, provided it is substantially rigid. Preferably, the hollow support member comprises a metal. More preferably, the metal is a high temperature metal (i.e., substantially maintains its physical properties at temperatures above about 600° C.) such as a nickel-chrome-iron alloy (including those commercially available under the trademarked designations "INCONEL 600" and "INCOLOY 800" from Inco Alloy International, Inc. of Huntington, Va., "HAYNES 556" from Haynes International of Kokomo, Ind., and "KANTHAL A1" from The Kanthal Corp. of Bethel, Conn.).

The shape of the hollow, tubular support member can vary by convenience, as described above for the casing. Preferably, the hollow support member has a circular or elliptical cross-section.

The openings in the hollow support member should be as large as possible while maintaining rigidity. Preferably, each opening is of a diameter in the range from about 1 to about 20 mm, far too large to trap any particle in the exhaust. More preferably, each opening is of a diameter in the range from about 2 to about 10 mm, and most preferably in the range from about 3 to about 7 mm.

The size of individual openings may be the same, different, or a combination thereof.

Preferably, the openings occupy in the range from about 40 to about 80 percent of the total projected area of the hollow support member. More preferably, the openings occupy in the range from about 50 to about 70 percent of the total projected area of the hollow support member. An open area substantially above 80 percent may significantly affect the structural integrity of the hollow support member. On the other hand, an open area substantially below 40 percent may cause undesirably high back pressures during use.

The openings are preferably uniformly distributed over the surface of each hollow support member, except the ends of the support member which are preferably imperforate.

The filter element or media comprising the inorganic fiber or yarn can be in any shape useful for trapping diesel particulate soot. Suitable filtering elements or media include inorganic fiber or yarn helically wound around the hollow support member or the electrically resistive tube; woven fabric, nonwoven mats, or combinations thereof.

The inorganic fibers or yarn are preferably ceramic. The ceramic fibers or yarn can be, for example, amorphous (including glass), polycrystalline, or a combination thereof. Useful ceramic fibers or yarns are known in the art for such purposes and include those comprising aluminoborosilicate, aluminum oxide, silicon dioxide, or silicon carbide.

The filtering element configuration is preferably selected to allow a high degree of filtering efficiency without significant back pressure.

Wound Inorganic Yarn

Preferably, the inorganic yarn helically wound around the hollow support member or the electrically resistive tube has a diameter in the range from about 0.5 to about 5 mm. More preferably, the diameter is in the range from about 1 to about 3 mm. Yarn diameters in the specified ranges typically have superior textile qualities as compared to yarns with diameters outside of these ranges. Such yarns typically comprise in the range from about 780 to about 7800 individual inorganic fibers. Preferably, the inorganic yarn comprises in the range from about 1560 to about 4680 individual fibers. The inorganic yarn can be ply-twisted.

The inorganic fibers preferably have a diameter in the range from about 5 to about 20 micrometers. More preferably, the inorganic fibers have a diameter in the range from about 7 to about 15 micrometers, and most preferably, in the range from about 9 to about 14 micrometers. Fibers having a diameter within the specified ranges generally are easier to make and texturize than are fibers having diameters substantially outside of these ranges. Further, fibers substantially below 5 micrometers in diameter tend to be easily damaged (i.e., broken when texturized). Fibers substantially above 20 micrometers in diameter typically provide a filter which is less efficient than do fibers having diameters within the specified ranges.

Useful ceramic yarns include those comprising fibers made of aluminoborosilicate, aluminum oxide, silicon dioxide, or silicon carbide. Preferably, the ceramic fiber comprises an aluminoborosilicate. To aid in handling, the yarns are preferably sized using conventional sizing techniques. Aluminoborosilicate fibers are commercially available, for example, under the trademarked designations "NEXTEL 312 CERAMIC YARN" and "NEXTEL 440 CERAMIC YARN" from the 3M Company of St. Paul, Minn. Texturization of the inorganic yarn improves its filter or trapping efficiency. Preferably, the inorganic yarn is texturized such that it is lofty, e.g., by being texturized so that loops of continuous fibers, individual fiber segments or a combination thereof extend outwardly from a dense core. Loops of continuous fibers are most preferred. The inorganic yarn can be texturized by techniques known in the art including, for example, air jet or mechanical texturization. Air jet texturization is preferred because it generally provides a texturized yarn having fewer fiber segments and more fiber loops than does yarn texturized by the mechanical technique.

Preferably, the texturized inorganic yarn has a diameter in the range from about 1 to about 10 mm. More preferably, the diameter of the texturized inorganic yarn is in the range from about 3 to about 6 mm. The filtering or trapping efficiency of texturized yarn having a diameter in the specified ranges is generally superior to such yarns having diameters outside of these ranges.

For enhanced filtering efficiency, the inorganic yarn is preferably substantially helically cross-wound around the slotted tube. More preferably, the yarn is substantially helically cross-wound around the tube to form four-sided openings.

Preferably, the inorganic yarn comprises a dense core from which at least one of loops of continuous fibers and fiber segments extend outwardly, wherein the cores of successive convolutions of each successive layer are radially aligned to provide relatively dense walls that are spaced to define four-sided openings, and wherein the loops of fibers and the fiber segments project into each of said openings, with loops of fibers and fiber segments of adjacent convolutions being intermeshed to provide with each of the openings a trap for diesel exhaust particulates.

Figure 14:
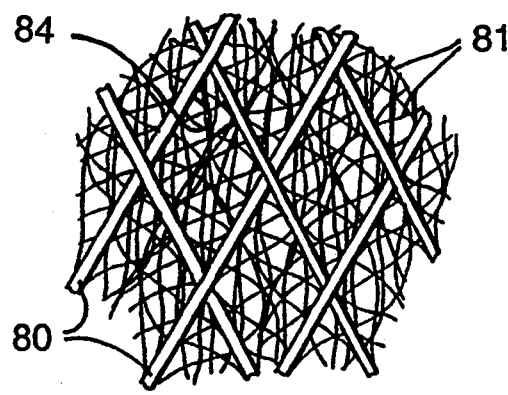
FIG. 14 shows a portion of the surface of a filtering element, greatly enlarged.
Figure 15:
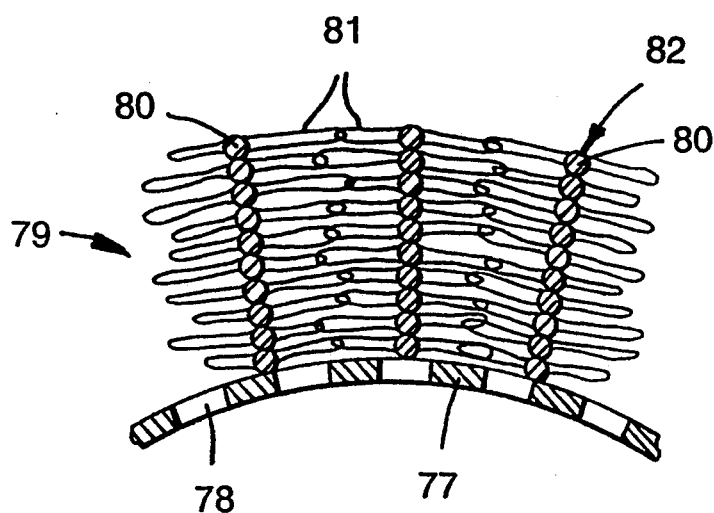
FIG. 15 is a cross section of a four-sided filtering element, greatly enlarged.

Referring to FIGS. 14 and 15, four-sided filter element 79 has helically cross-wound inorganic yarn comprising ceramic yarn having dense core 80 from which fiber segments, loops of continuous fibers, or combinations thereof 81 protrude outwardly. FIGS. 14 and 15 show yarn which is cross-wound in layers, initially at an angle of about 45° to the axis of hollow support member or electrically resistive tube 77 (having openings or slots 78) in each winding direction.

To form the four-sided openings, the winding angle of each successive layer (i.e., one complete covering of the hollow support member (or electrically resistive tube) before the four-sided pattern repeats) of yarn is slightly increased (i.e., about 0.25°) such that the core of the yarn is radially aligned with the underlying core. This winding arrangement results in adjacent convolutions being widely spaced in the first pass and then interspersed with subsequent convolutions until the spacings between adjacent convolutions are uniform. This arrangement inherently results in the interweaving of oppositely directed convolutions in each of the layers providing stabilization to the filtering element against exhaust forces.

Figure 13:
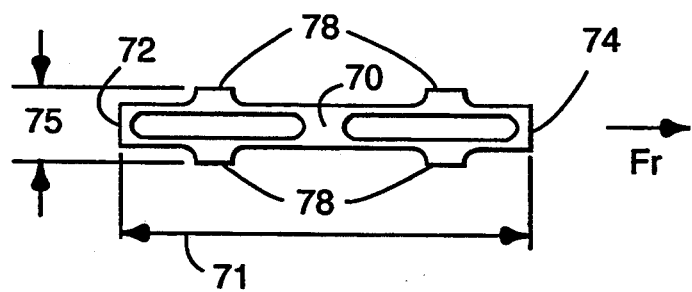
FIG. 13 is a schematic of a model used for finite element analysis of the heater element configuration depicted in FIG. 2.

The radially aligned cores on a tube collectively form relatively dense walls 82 which are spaced to define four-sided openings 84 (i.e., diamond-shaped). Fiber segments, fiber loops, or combinations thereof 81 project into each of four-sided openings 84, with fiber segments and fiber loops of laterally adjacent convolutions being intermeshed as shown in FIG. 13.

As the windings extend into the imperforate areas, the winding angle is preferably changed under computer control so that adjacent convolutions of the yarn are progressively brought more closely together to provide relatively thick end walls that are substantially impervious to the flow of exhaust.

Because each of walls 82 extend radially, openings 84 are funnel-shaped as viewed in FIG. 15. Further, the density of fiber segments and fiber loops tend to increase from the outer face to the base of each opening, providing a distribution of particulate traps over the full depth of the filtering element, when the exhaust flows radially inwardly through the filtering element. The filtering capability of the filter element can be enhanced by using higher texturized yarn in the downstream portion and using progressively less texturized yarn in the portions further upstream.

Preferably, cores of convolutions of at least one layer are laterally offset from cores of convolutions of an adjacent layer to deflect the generally radial exhaust flow into tortuous paths. More preferably, the filtering element comprises at least 4 layers of yarn (preferably, 10 to 30 layers) and the cores of convolutions of at least 3 layers (preferably, 5 to 15 layers) laterally offset from cores of convolutions of the underlying layer. Further, cores of convolutions of adjacent offset layers are preferably more closely spaced from each other than are cores of convolutions of the same layer. Closer spacings afford better support to the fiber segments, thus reducing damage and also enabling each fiber segment to support a greater density of soot, advantages that can be attained while keeping back pressures satisfactorily low. In contrast, when all cores of successive convolutions are radially aligned with the cores of underlying convolutions, any reduction in spacing between cores increases the back pressure.

Figure 16:
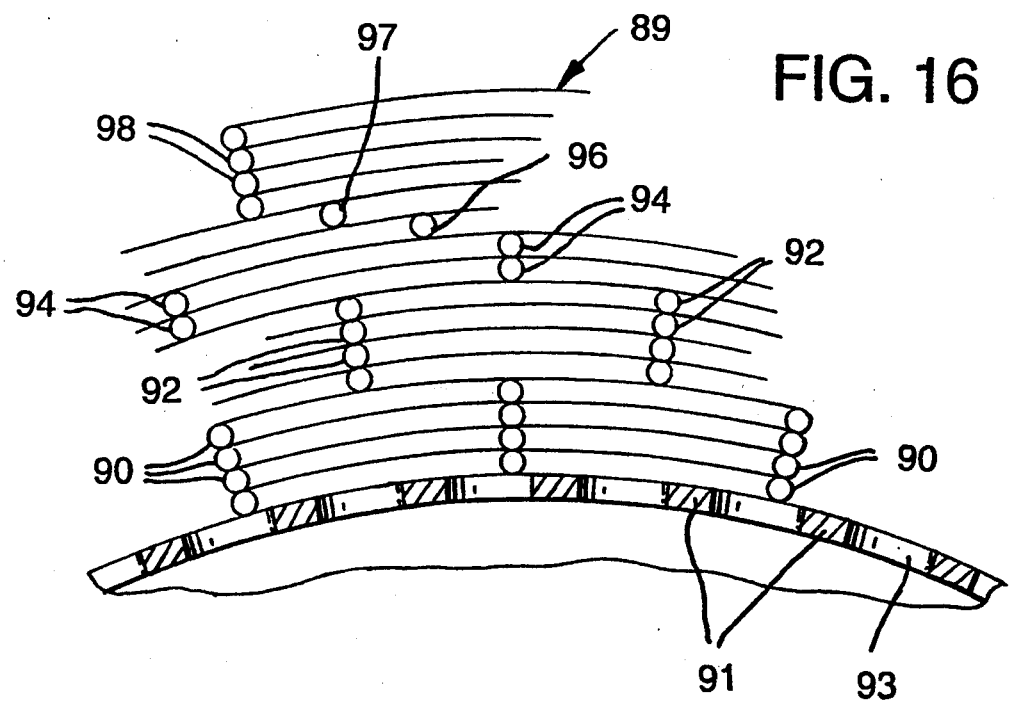
FIG. 16 is a cross section of a four-sided filter element having laterally offset cross-wound wraps, greatly enlarged.

Referring to FIG. 16, four-sided filter element 84 having laterally offset cross-wound wraps has cores of each successive convolution of first four layers 90 of untexturized yarn tightly wound against and radially aligned with the core of an underlying convolution. The radially aligned cores together form spaced walls defining a first setof four-sided openings that are funnel-shaped as viewed in FIG. 16.

By rotating the mandrel 23° before applying a second set of four layers 92 of texturized yarn, their cores of radially aligned convolutions bisect the four-sided openings formed by the first four layers 90, thus forming a second set of four-sided openings. After rotating the mandrel another 23°, a third set of two yarn layers 94 were laid down to form a third set with four-sided openings. As seen in FIG. 16, the cores of radially aligned yarn convolutions of the third set of layers 94 bisect the second set of four-sided openings and are radially aligned with the cores of convolutions of the first set of four layers 90.

The mandrel was then rotated 11.5° before applying a single-yarn fourth layer 96 that forms a fourth set of four-sided openings. Each core of a convolution of the fourth layer 96 is laterally offset 25% of the distance across four-sided openings of the third set of layers 94.

The mandrel was again rotated 11.5° before applying a single-yarn fifth layer 97 that forms a fifth set of four-sided openings. Each core of a convolution of the fifth layer 97 bisects four-sided openings of the third set of layers 94 and is radially aligned with cores of convolutions of the second set of layers 92.

The mandrel was again rotated 11.5° before applying a sixth set of four yarn layers 98 that are radially aligned to form a sixth set of four-sided openings. Each convolution of the yarn cores of the sixth layers 98 bisects spaces between cores of convolutions of the fifth layer 97 and cores of convolution of the third set of layers 94. The resulting filtering element 89 on hollow support member or slotted electrically resistive tube 91 having openings or slots 93 contains sixteen layers of yarn.

When applying each successive yarn layer of the filtering element 89, the winding angle is slightly increased (e.g., about 0.25°) either to place the yarn core in radial alignment with the underlying core of the previous layer or to provide a desired lateral offset. Exhaust gas is deflected into tortuous paths by the laterally offset yarn cores of the outer five sets of layers of the filtering element 89.

As the windings for the four-sided filters extend into the imperforate areas, the winding angle is preferably changed under computer control so that adjacent convolutions of the yarn are progressively brought more closely together to provide relatively thick end walls that are substantially impervious to the flow of exhaust.

The density of fiber segments and loops of continuous fiber tend to increase from the outer face to the base of each opening, providing a distribution of particulate traps over the full depth of the filtering element. The filtering capability of the filter element can be enhanced by using higher texturized yarn in the downstream region and using progressively less texturized yarn in the regions further upstream.

Preferably, the angle at which a filtering element is wound is in the range from about 30° to about 70° to the axis of the hollow support member (or electrically resistive tube) in each winding direction. More preferably, the winding angle is in the range from about 30° to about 60°. Most preferably, the winding angle is in the range from about 45° to about 55°. Use of winding angles within the specified ranges typically provide a filtering element which is more efficient and is better secured to the hollow support member (or electrically resistive tube) than filters wound at an angle substantially outside of these ranges.

For a single cross-wound circuit (i.e., one winding pass in each direction), the four-sided openings (where they cover the open or slotted areas) are preferably of uniform size and shape.

Preferably, the opening size between opposite corners of the four-sided openings is in the range from about 3 mm to about 10 mm in the axial direction of the tube and in the range from about 6 to about 12 mm in the circumferential direction of the hollow support member (or electrically resistive tube). More preferably, the opening size between opposite corners of the four-sided openings is in the range from about 4 mm to about 7 mm in the axial direction of the hollow support member (or electrically resistive tube) and in the range from about 7 mm to about 10 mm in the circumferential direction of the hollow support member (or electrically resistive tube). Openings substantially larger than the stated ranges may provide inadequate filtering efficiency, whereas openings substantially smaller than the stated ranges may result in undesirably high back pressures.

In winding the yarn around the hollow support member (or electrically resistive tube), the winding tension is preferably as high as possible, without breaking the yarn. Typically the winding tension is in the range from about 4 to about 19.6 Newtons. Preferably, the winding tension is in the range from about 4 to about 13 Newtons. Excessive winding tensions tend to produce an undesirable compaction where convolutions are supported by fiber segments of the underlying layer.

To increase the accumulation of soot near the electrically resistive sheet, the region of the filter element upstream from the electrically resistive sheet is preferably relatively free of loops of continuous fibers and fiber segments (i.e., lightly texturized). More preferably, the region of the filter element upstream from the electrically resistive sheet is non-texturized.

Each filtering element can comprise one or more layers of substantially helically wound cross-wound inorganic yarn, or it can comprise one or more nonwoven mats comprising inorganic fibers, wherein the mat is held against the radially outer perforated or slotted surface of each tube by substantially helically wound cross-wound inorganic yarn.

For a filtering element comprising the substantially helically wound cross-wound texturized yarn comprising ceramic fibers, it may be desirable to incorporate some heat-fugitive yarn into the windings. The passageways left behind when the heat-fugitive yarn are burned away during or prior to the first use of the filter may provide both reduced back pressure and enhanced access to the filtering fibers.

Preferably, the filtering element has an annular thickness in the range from about 1 to about 25 mm. For filtering elements comprising substantially helically wound cross-wound, texturized yarn comprising inorganic fibers, the preferred total annular thickness of the wound cross-wound fibers is in the range from about 5 to about 15 mm. For a filtering element comprising substantially helically wound cross-wound texturized yarn and a nonwoven mat, the preferred annular thickness of the filtering element is in the range from about 3 to about 8 mm. Thicknesses substantially greater than the stated ranges may unduly increase cost and may also result in undesirably high back pressures, whereas thicknesses substantially smaller than the stated ranges may provide inadequate filtering efficiency.

For filters having a buried heating element, the annular thickness of the inner filtering element is typically sufficient to electrically insulate an electrically conductive hollow support member from the electrically resistive tube. An inner filter element should be thick enough to provide electrical insulation between the electrically resistive tube and an electrically conductive hollow support member. Typically, the annular thickness of an inner filter element is in the range from 0.25 to about 0.75 cm. Preferably, the annular thickness of an inner filter element is in the range from about 0.35 to about 0.5 cm.

Woven Fabric

Suitable woven fabrics comprising inorganic fibers or yarns are known in the art for such use and include those commercially available, for example, under the trade designation "NEXTEL CERAMIC FABRIC" from the 3M Company of St. Paul, Minn.

The fabric can be secured to the supporting tube by means known in the art, including wrapping fabric around the hollow support member (or electrically resistive tube) and then helically winding fiber (including metal wire) or yarn around the fabric; wrapping fabric around the hollow support member or electrically resistive tube and then sewing ends of the fabric together; and forming the fabric into a tube and slipping it over the hollow support member or electrically resistive tube.

A preferred fabric is disclosed in U.S. Pat. No. 5,180,409 (Fischer), the disclosure of which is incorporated herein for its disclosure of how to make the fabric and use it as filter media for a diesel particulate filter. This preferred fabric is an unknotted weave of flexible, substantially incompressible, substantially uncrimped, spaced support strands and flexible, lofty, substantially fully crimped fill yarns that are pulled tightly against the support strands. By "substantially incompressible" it is meant that the support strands maintain their shape and diameter when the lofty fill yarns are pulled tightly against the support strands.

Preferably, the support strands of the preferred fabric are yarns that are rendered substantially incompressible by being made from a plurality of small glass or ceramic fiber ends (preferably from 3 to 8 ends/bundle and from 300 to 1600 fibers/end) that are uniformly twisted together, preferably having from 0.4 to 3 twists/cm, after which a plurality of those intertwisted bundles (preferably from 2 to 6) are twisted together in the opposite direction at the same number of twists/cm.

By "crimp" it is meant the generally sinuous form taken up by a yarn during the weaving action of producing a fabric. Further with regard to the preferred fabric, the term "lofty" refers to a yarn which, when unstressed, has a void volume of at least 75%. The void volume of a yarn can be calculated by using a graduated microscope to measure the nominal diameter (D) and a scale to measure the mass (M) of a length (L) of the yarn. The void volume (VV) is then obtained from the following equation:

$$VV = 1 - \frac{M/\rho}{\pi L D^2 / 4}$$

wherein $\rho$ is the bulk density of the yarn.

The D of a texturized yarn is the diameter of a cylindrical envelope to which the loops extend, which envelope bridges any valleys at the surface of the yarn and so encompasses voids at those surfaces.

To enhance texturizing, individual ends of the fill yarns should not be highly twisted, i.e., they preferably have less than 2 twists/m, and the ends should not be tightly twisted together, i.e, preferably having no more than one twist/cm. When the ends are twisted together, texturizing also is enhanced by employing only a few ends per yarn, preferably two or three.

For optimum filtering efficiency, while keeping back pressures low, the fill yarns should be texturized to a void volume of at least 85%, more preferably, at least 95%. To keep back pressures low, the fill yarns preferably are spaced from each other, but the outermost fibers of highly texturized fill yarns can be intermeshed without appreciably increasing back pressures. When the fill yarns are not intermeshed, a filter should employ multiple layers of the novel fabric.

For convenience of manufacture, the support strands preferably are the warp, and the fill yarns are the weft of the novel fabric and are pulled tightly against the support strands during the weaving process. By being pulled tightly against the support strands, the fill yarn is flattened where it contacts a support strand, thus helping to prevent the fill yarn from slipping or shifting, especially when the fill yarn is flattened at each support strand to a thickness less than one-fifth its nominal diameter. For better assurance against slippage, the flattening should be from 1/10 to 1/20 of the nominal diameter of the fill yarn. Even when so flattened, intervening portions of the fill yarn retain their lofty character.

Where a filter requires significant thicknesses, i.e., multiple layers of the novel fabric, this can be achieved at greater economy when the novel filtering fabric is a multi-warp fabric.

If the filter element includes multiple layers of the preferred fabric, the support strands of adjacent layers preferably extend orthogonally to each other to minimize nesting. When two or more layers of the fabric are used as the filter media, the support strands of the innermost layer preferably extend in the circumferential direction, thus making it easier to pull that layer snugly against the substrate.

Nonwoven Mats

Typically, the fibers comprising the nonwoven mat have a diameter up to about 20 micrometers. Preferably, the fibers comprising the nonwoven mat have a diameter in the range from about 3 to about 20 micrometers.

Suitable nonwoven mats are known in the art and are commercially available, for example, under the trademarked designation "SAFFIL LD MAT" from Imperial Chemicals, Inc., of Cheshire, U.K.

Preferred nonwoven mats can be prepared as described in copending application entitled "Flexible, Needle-Punched, Nonwoven Mat" having U.S. Ser. No. 08/001,325, filed Jan. 7, 1993, the disclosure of which is incorporated herein by reference, for its teaching of how to make a nonwoven mat and how to make a flexible, needle-punched, nonwoven mat. The nonwoven mat can be needle punched, for example, as taught in the application just mentioned or stitch bonded as described for example, in U.S. Pat. No. 4,181,514 (Lefkowitz et al.), the disclosure of which is incorporated herein by reference for its teaching of how to stitch bond a nonwoven mat.

Additional details regarding the constructions of diesel particulate filter cartridges and filters are disclosed in copending applications entitled "Diesel Particulate Trap of Perforated Tubes Wrapped with Cross-Wound Inorganic Yarn to Form Four-Sided Filter Traps," U.S. Ser. No. 07/681,147 and "Diesel Particulate Trap of Perforated Tubes Having Laterally Offset Cross-Wound Wraps of Inorganic Yarn," U.S. Ser. No. 07/881,488, the disclosures of which are incorporated herein by reference.

To aid in the oxidation of carbon and soluble organic constituents (e.g., hydrocarbons and carbon monoxide) of diesel exhaust soot particulates, the filter element can further comprise an oxidation catalyst coated onto the inorganic fiber or yarn. Such oxidation catalysts are known in the art and include catalytic metal oxides (e.g., titanium oxide and vanadium pentoxide), precious metals (e.g., platinum, rhodium, other platinum group metals, and silver), and base metals (e.g., copper, iron, manganese, and potassium). Methods for coating the catalyst onto the inorganic yarn and nonwoven mat are known in the art.

Figure 3:
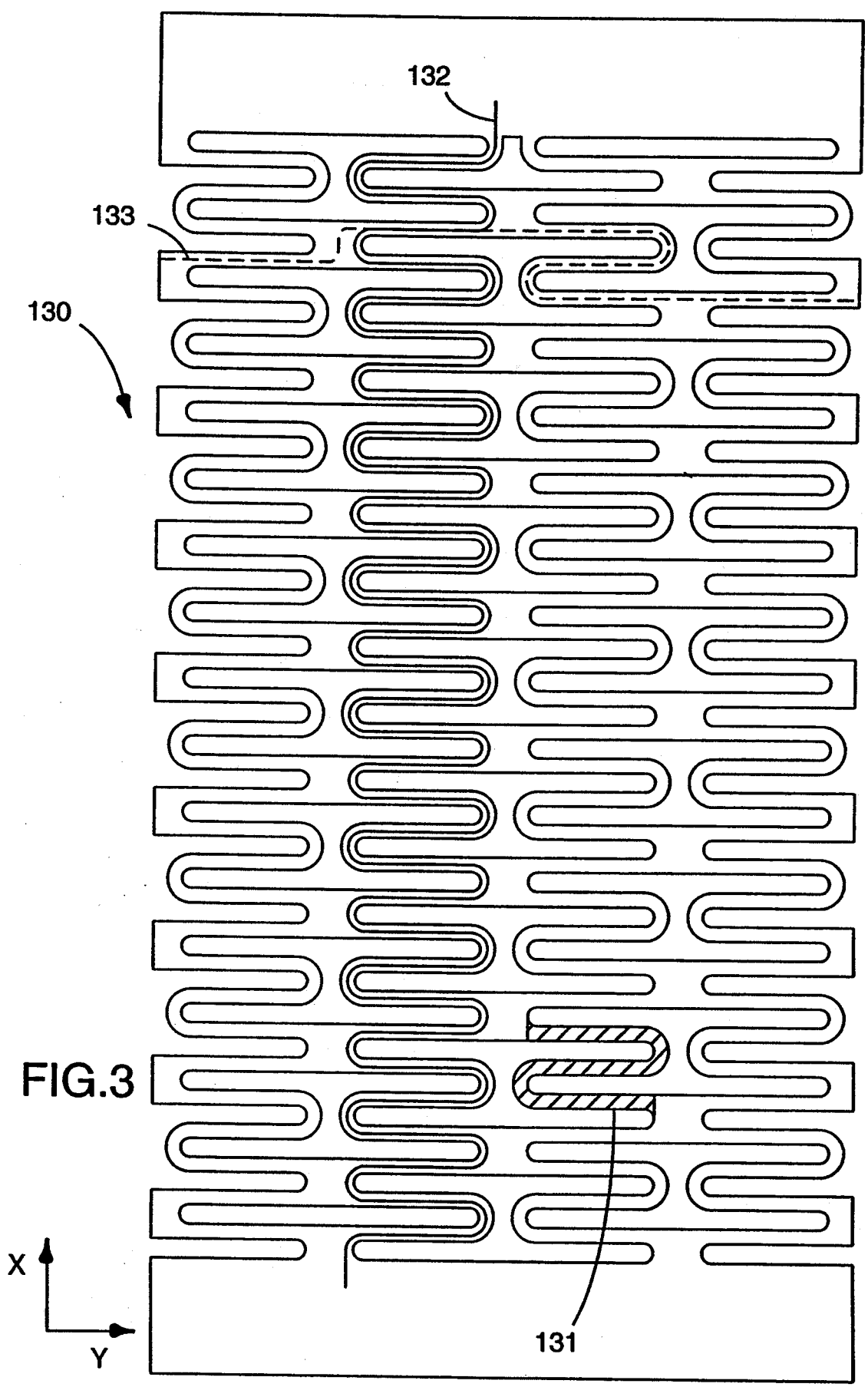
FIG. 3 is a top view of a first preferred electrical heating element configuration that is useful in making the electrically resistive tube employed in a diesel particulate filter cartridge according to the present invention.
Figure 4:
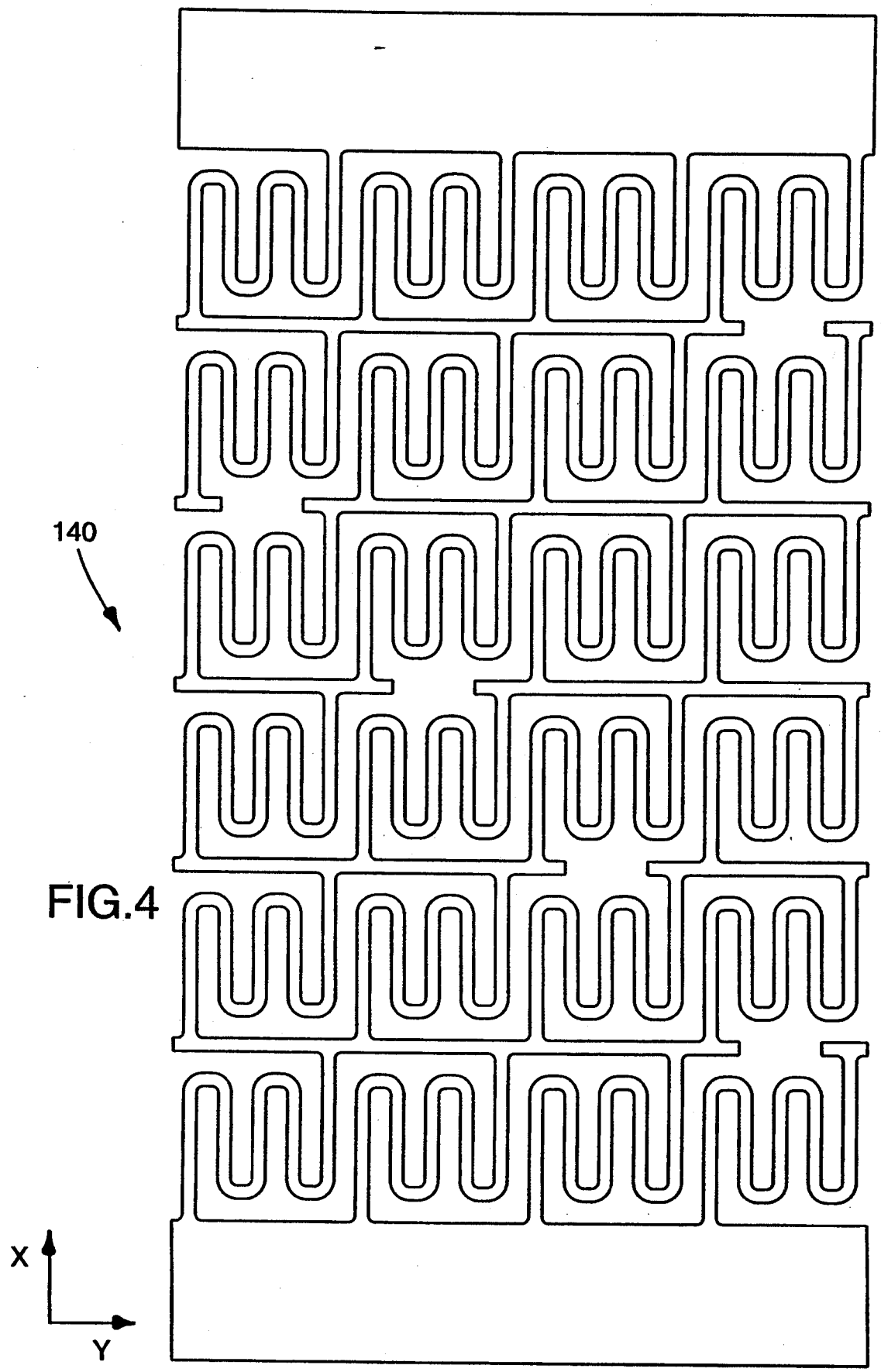
FIG. 4 is a top view of a second preferred electrical heating element configuration that is useful in making the electrically resistive tube employed in a diesel particulate filter cartridge according to the present invention.
Figure 5:
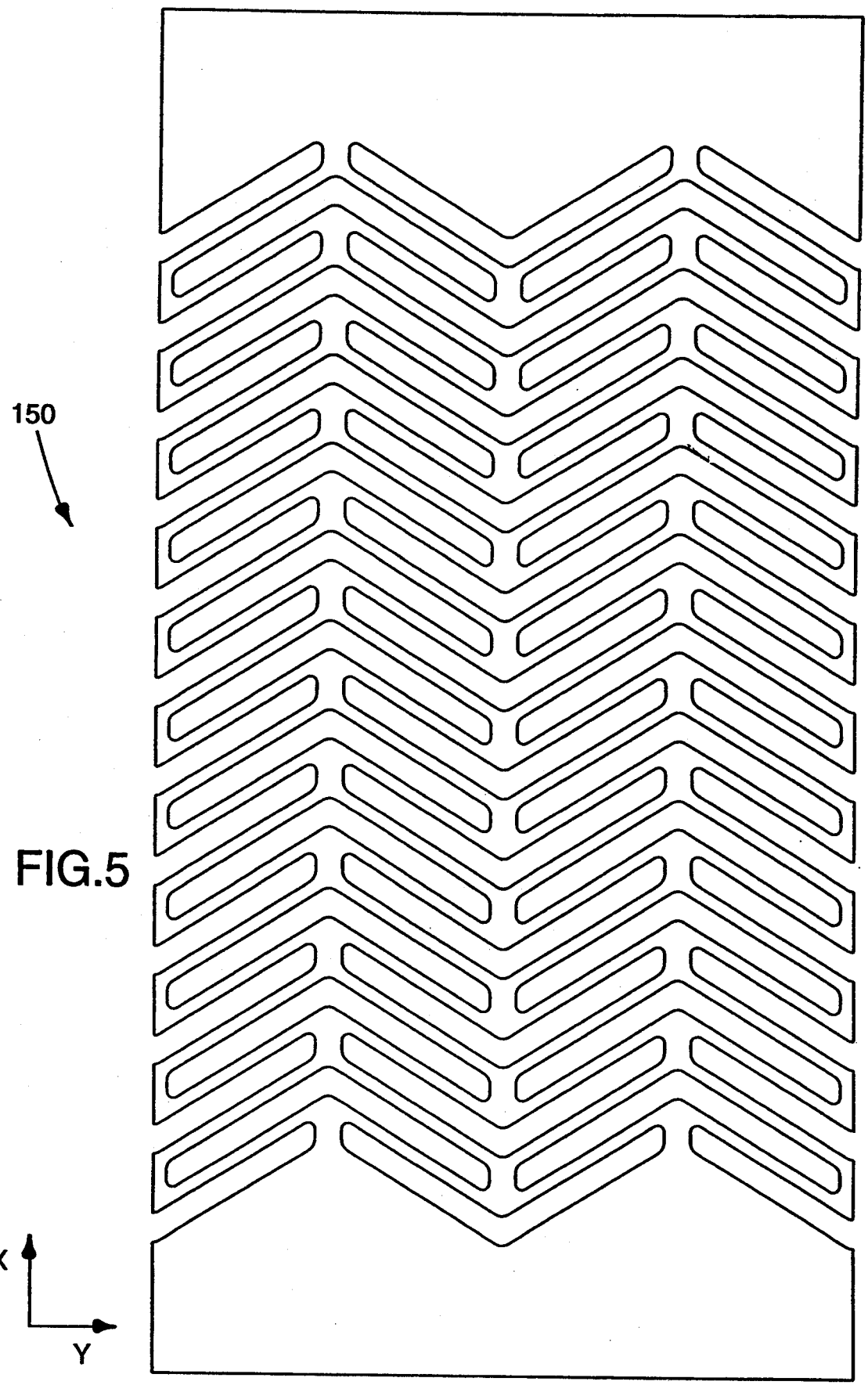
FIG. 5 is a top view of a third preferred electrical heating element configuration that is useful in making the electrically resistive tube employed in a diesel particulate filter cartridge according to the present invention.
Figure 6:
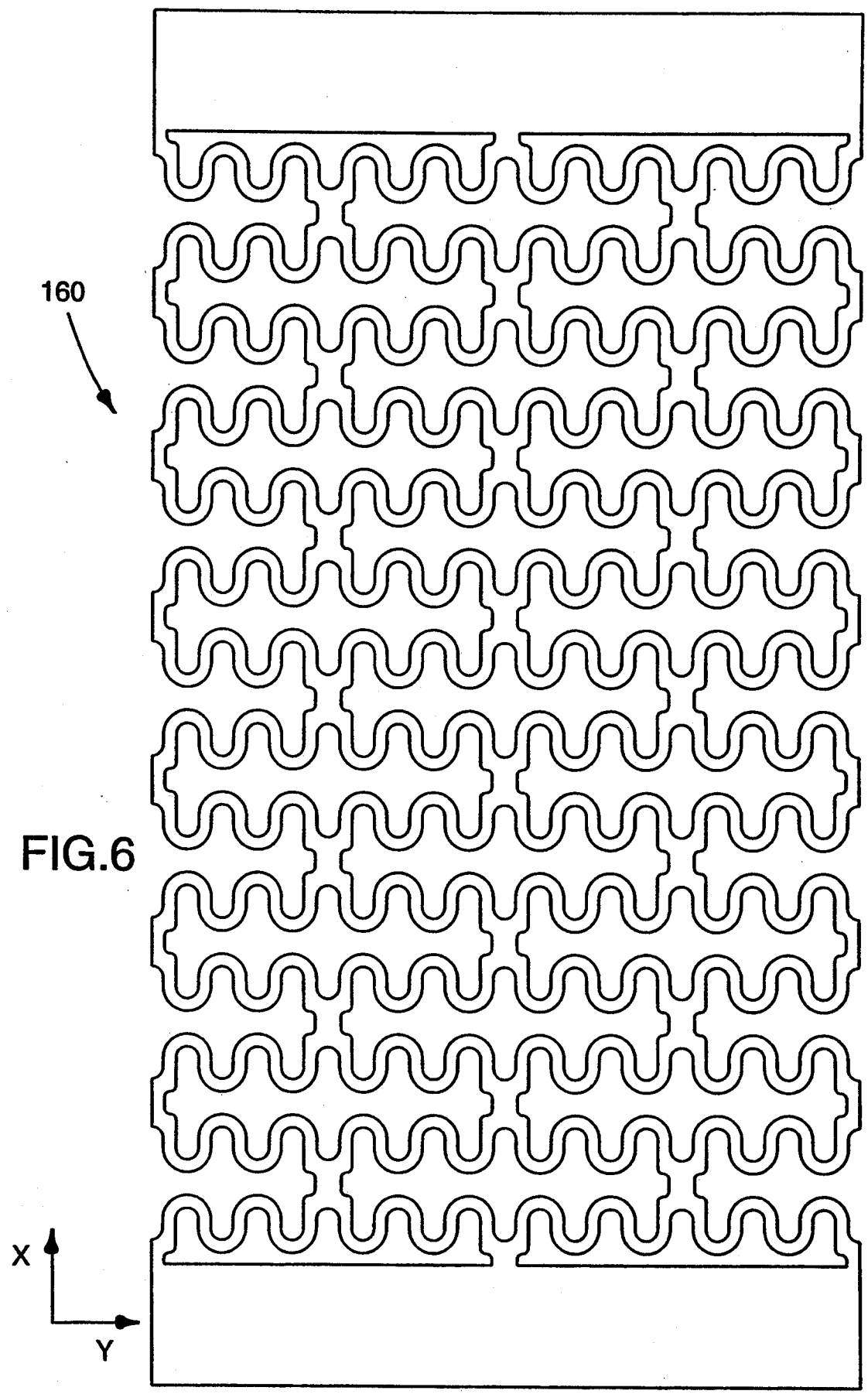
FIG. 6 is a top view of a fourth preferred electrical heating element configuration that is useful in making the electrically resistive tube employed in a diesel particulate filter cartridge according to the present invention.
Figure 7:
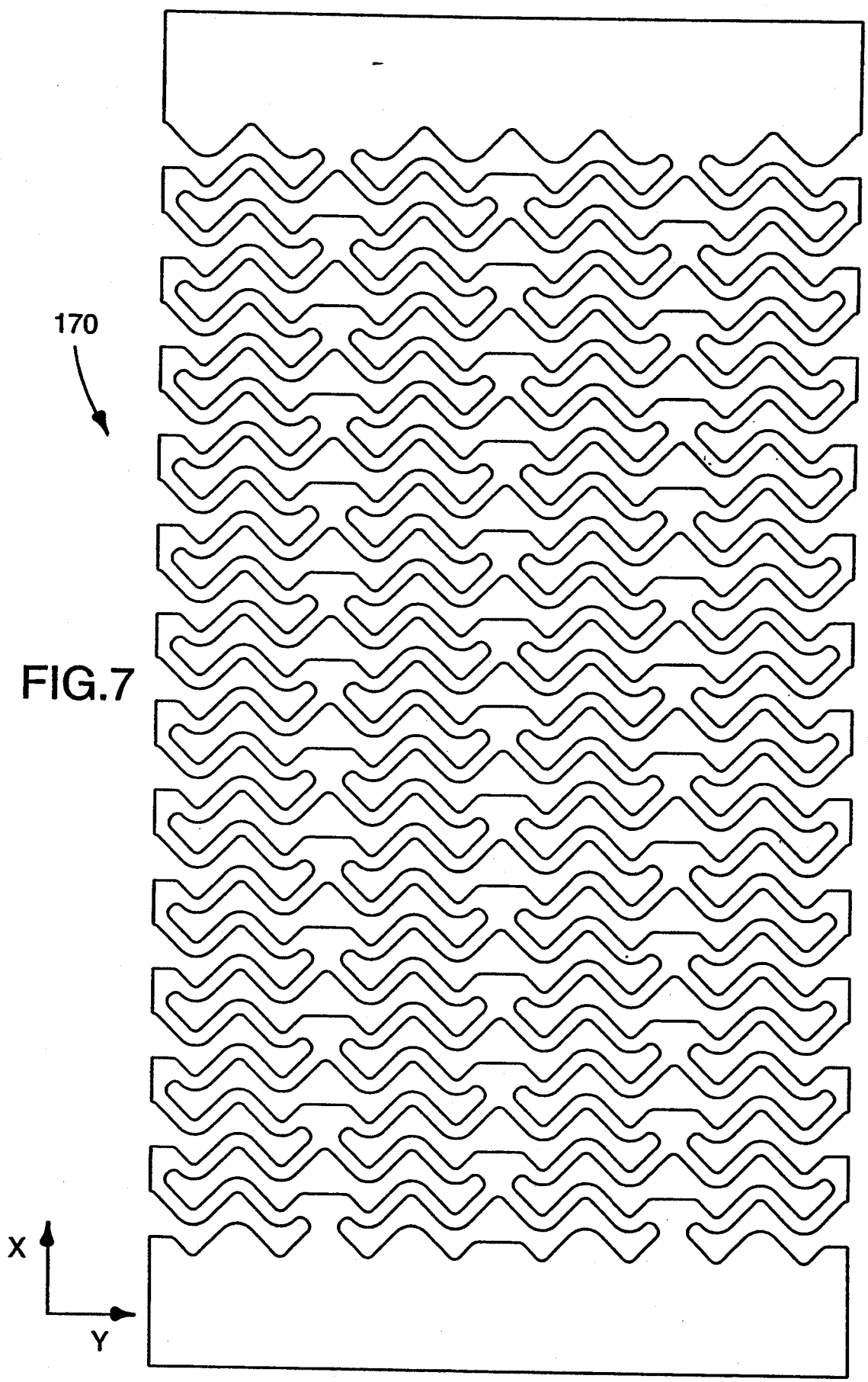
FIG. 7 is a top view of a fifth preferred electrical heating element configuration that is useful in making the electrically resistive tube employed in a diesel particulate filter cartridge according to the present invention.

FIGS. 3–8 are top views of electrical heating element configurations that are useful in making the slotted electrically resistive tube employed in a diesel particulate filter cartridge according to the present invention. FIG. 3 depicts an "H-Slot" configuration 130; FIG. 4 a "Vertical Spiral" configuration 140; FIG. 5 a "V-Slot" configuration 150; FIG. 6 a "Dumbbell" configuration 160; FIG. 7 a "Zig-Zag" configuration 170; and FIG. 8 a "Modified Zig-Zag" configuration 180. Further, these exemplary configurations can be modified (e.g., the angles of the strands of the V-Slot configuration can be modified) as needed to meet the requirements of the particular filter cartridge design.

The H-Slot, Vertical Spiral, and Dumbbell configurations are preferably located on the exterior of or buried within the filter element. The V-Slot, Zig-Zag, and Modified Zig-Zag are preferred configurations for the heater element of the first diesel particulate filter cartridge according to the present invention where the slotted electrically resistive tube serves as the support tube for the filter media.

If inorganic yarn is helically wound around the electrically resistive tube, care should be taken in selecting the heating element configuration and the winding pattern of the yarn to prevent the yarn from falling through the slots of the heating element. For example, if slots in the heating element are at an angle of 45° and the winding angle is at the same relative angle, the yarn, if it is thinner than the slot, would slip through the slot.

Preferably, the slots of the slotted electrically resistive tube occupy in the range from about 10 to about 70 percent of its projected area. More preferably, the slots of the electrically resistive tube occupy in the range from about 40 to about 60 percent of its projected area. Projected slot areas with these ranges provide the best compromise between the desired low back pressure across the filter elements, the desired conformability to the associated filter elements, and the desired rigidity or integrity of the electrically resistive tube.

The size of the slots in the electrically resistive tube are dependent on the particular filter cartridge requirements which include the power requirements, size of the filter cartridge, the location of the electrically resistive tube (e.g., exterior of filter element, buried within the filter element, or serves as the support tube to the filter element), and gas flow through the filter.

The electrical resistivity of the electrically resistive sheet can be tailored, for example, by the choice of material used (e.g., the particular metal chosen), the thickness of the strands, the width of the strands, the current path lengths, the number of strands, and the power requirements.

Preferably, the current path length across the length of the slotted electrically resistive tube is at least 1.1 times the length of the slotted electrically resistive tube, and the current path length around the circumference of the slotted electrically resistive tube is at least 1.1 times the circumference of the slotted electrically resistive tube. In another aspect, the current path length across the length of the slotted electrically resistive tube is typically greater than the current path length around the circumference of the slotted electrically resistive tube.

Preferably, the power concentration of the electrically resistive sheet configuration used is in the range from about 1 to about 7 watts/$cm^2$. Power consumption values within these ranges typically provide reasonable regeneration performance without excess energy consumption.

The material comprising the electrically resistive sheet should be resistant to high temperatures (e.g., temperatures above about 600° C., be chemically resistant to diesel exhaust, and be ductile). Preferably, the electrically resistive material is a metal. Suitable metals include stainless steel (commercially available, for example, from Falcon Stainless and Alloy Corp. of Waldwick, N.J.). Preferred metals include nickel-chrome-iron alloys (e.g., those commercially available under the trademarked designations "INCONEL 600" and "INCOLOY 800" from Inco Alloy International, Inc., of Huntington, Va., "HAYNES 556" from Haynes International of Kokomo, Ind., and "KANTHAL A1" from The Kanthal Corp. of Bethel, Conn.).

The slots can be cut into the electrically resistive sheets to provide the desired configurations using conventional processing techniques including punching, stamping, laser cutting, water jet cutting, and plasma cutting.

A sheet of electrically resistive material can be formed into a tube by conventional techniques, which include securing the side edges of the sheet that are brought together to form the tube. Means for securing the edges of the sheet together include those known in the art such as welding, stapling, and riveting.

The slots or slot patterns are preferably uniformly distributed over the surface of the tubular heater element, except the ends of the heater element which are preferably imperforate.

The electrically resistive tube has at least two current paths. Typically, the electrically resistive tube has at least four current paths.

The cross-sectional area of each strand is preferably in the range from about 0.3 to about 15 $mm^2$, wherein the width of each strand is preferably in the range from about 1.5 to about 6.5 mm and the thickness of the electrically resistive material is preferably in the range from about 0.2 to about 2.5 mm. More preferably, the cross-sectional area of each strand is in the range from about 0.5 to about 2 $mm^2$, wherein the width of each strand is preferably in the range from about 2 to about 4 mm and the thickness of the electrically resistive material is preferably in the range from about 0.3 to about 0.65 mm.

Although not wanting to be bound by theory, it is believed that the novel heating elements disclosed herein for use in the diesel particulate filter cartridges and filters according to the present invention have a reduced tendency to buckle as compared to known heating elements (see, e.g., FIGS. 1 and 2) because the novel heating elements are more compliant in the axial and circumferential directions. Such compliance is required for a tubular heating element that is retrained from thermal expansion in the radial and axial direction to minimize the buildup of compressive forces.

Figure 2:
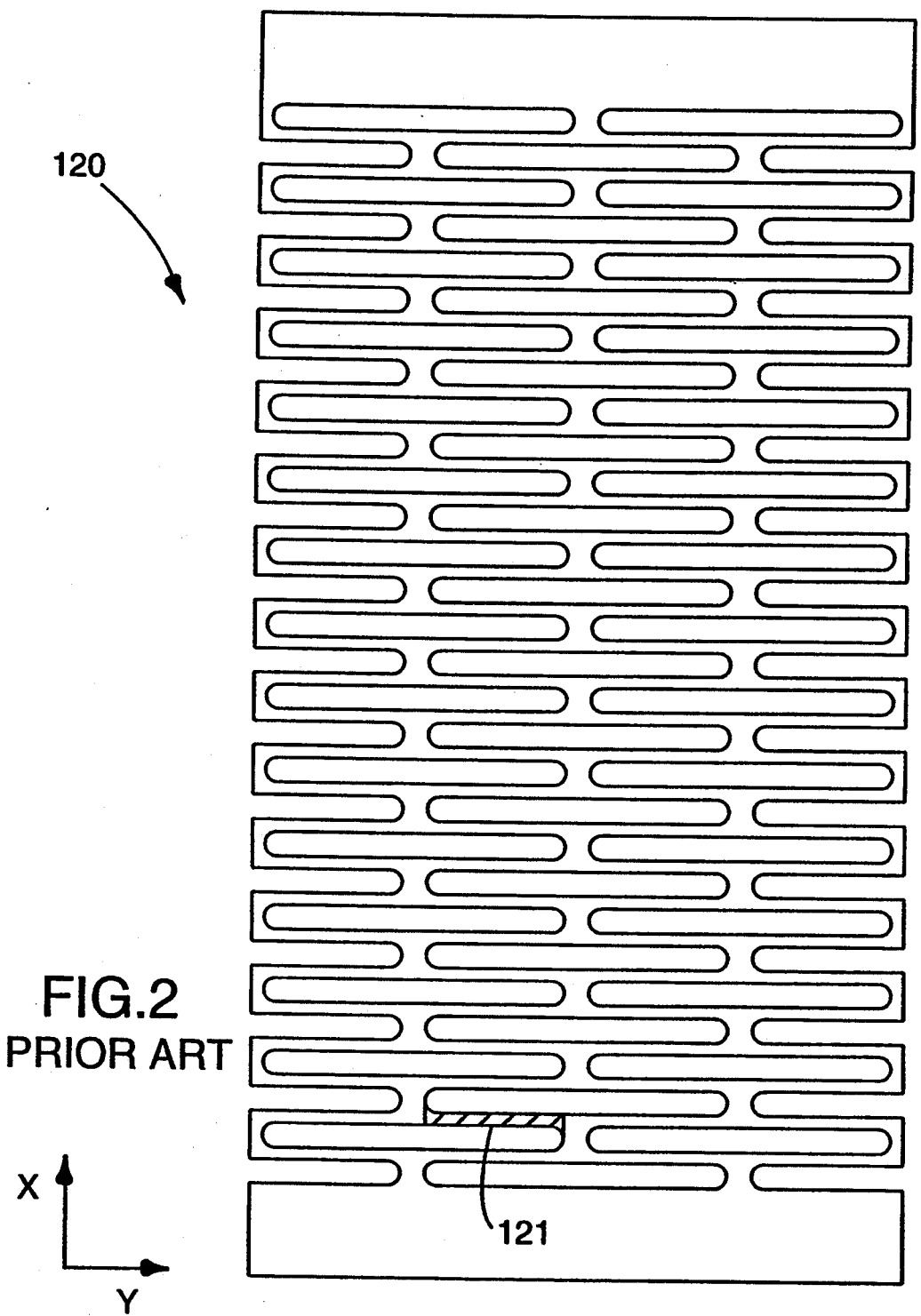
FIG. 2 is a top view of another electrical heating element configuration that is known to be useful in making an electrically resistive heating element used to regenerate a diesel particulate filter.

For example, referring to the configuration depicted in FIG. 2, the resulting compressive forces, $P_{App}$, in a strand due to the thermal expansion of the heating element, is defined by $$P_{App} = E\alpha \Delta T b t,$$

wherein
 E is the Young's modulus of the heating element material,
 $\alpha$ is the thermal expansion coefficient of the heating element material,
 $\Delta T = T_2 - T_1$, wherein $T_1$ is ambient temperature and $T_2$ is greater than $T_1$,
 b is the heater strand width, and
 t is the heater strand thickness.

By increasing compliancy in the axial and circumferential directions of a tubular heating element, the buildup of compressive forces is reduced as the thermal expansion is taken up in the circumferential plane of the heating element.

Preferably, the circumferential stiffness of the slotted electrically resistive tube is less than about 25 percent of the circumferential stiffness of a comparable electrically resistive solid tube (i.e., the same tube without the slots). More preferably, the circumferential stiffness of the slotted electrically resistive tube is less than about 10 percent of the circumferential stiffness of a comparable electrically resistive hollow, solid tube. Even more preferably, the circumferential stiffness of the slotted electrically resistive hollow, solid tube is less than about 5 percent of the circumferential stiffness of a comparable electrically resistive solid tube, and most preferably, less than about 3 percent.

Objects and advantages of this invention are further illustrated by the following examples, but the particular materials and amounts thereof recited in these examples, as well as other conditions and details, should not be construed to unduly limit this invention.

EXAMPLE 1

Figure 1:
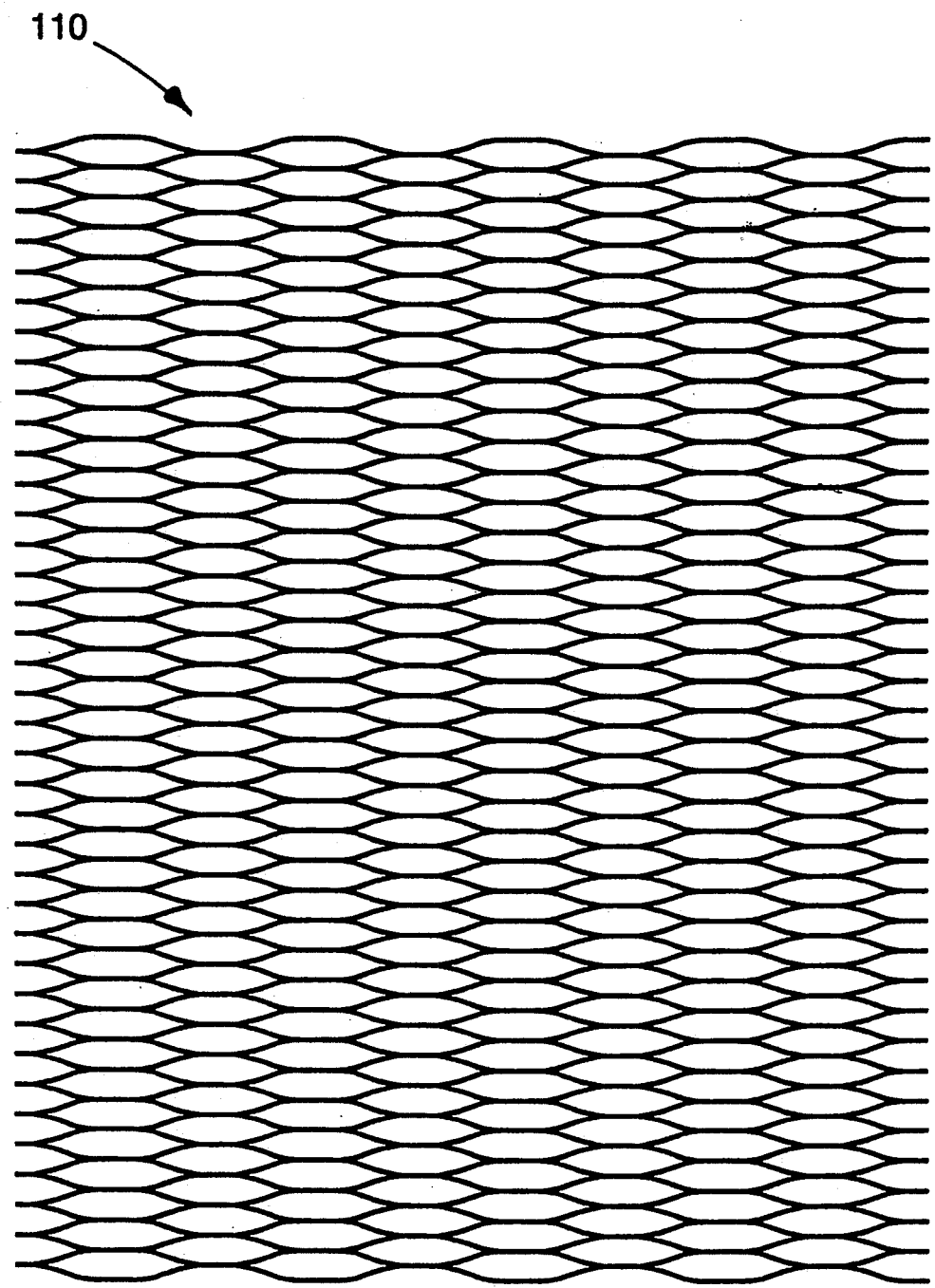
FIG. 1 is a top view of an electrical heating element configuration that is known to be useful in making an electrically resistive heating element used to regenerate a diesel particulate filter.
Figure 1:
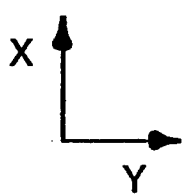

This example compares the circumferential stiffnesses of exemplary novel heater designs, a (comparable) hollow, solid tube (i.e., an unslotted hollow cylinder), and the configurations depicted in FIGS. 1 and 2 using finite element analysis. Finite element analysis was performed on each design depicted in FIGS. 1-8 to determine the stiffness in the circumferential direction (i.e., the circumferential stiffness) of a tubular heating element made therefrom. A flat symmetric section of each configuration was modeled to simulate the forces a tubular heater element experiences in use. Symmetry boundary conditions are used in finite element analysis modeling to analyze only a portion of a symmetric or repeating (patterned) structure. If the geometry and applied load are reflected or repeated about a plane(s), then only the portion adjacent to that plane(s) need be modeled. By applying displacement constraints to that plane(s), symmetric boundary conditions are imposed that represented the entire structure.

Due to the symmetry or repeating patterns of the exemplary configurations, only a sectioned portion of the configurations needed to be modeled for the present comparison.

Symmetric section 70 of the configuration depicted in FIG. 2 is shown in FIG. 13. Analyzing this section in a flat plane in tension was analogous to a radially restrained tubular heater in compression during regeneration. Symmetry boundary conditions were used along repeating symmetry edges 78. These symmetry boundary conditions applied to the model simulated the entire heater tube. For simplification of the comparison, the imperforate edges of the heater tube were neglected in the analysis. Length 71 of symmetric section 70 was 128.52 mm. The thickness, T, of symmetric section 70 was 0.4572 mm. Width, W, 75 of symmetric section 70 was 23.384 mm. Section end 72 was fixed. Symmetric section 70 was used to determine reaction force, $F_R$, required for a displacement, D, of section end 74 of 0.127 mm in the circumferential direction.

The stiffness, S, of a member is defined by $$S = \frac{F_R}{D}.$$

However, because the width of each modeled section was different, a comparable circumferential stiffness, $S_C$, defined by $$S_C = \frac{F_R}{D \cdot W \cdot T}$$

was needed to compare the different configurations.

Each configuration was modeled as described above for FIG. 2, except the width of the symmetric section was that listed in Table 1, below. The results of the finite element analysis are provided in Table 1, below,

TABLE I

Figure 8:
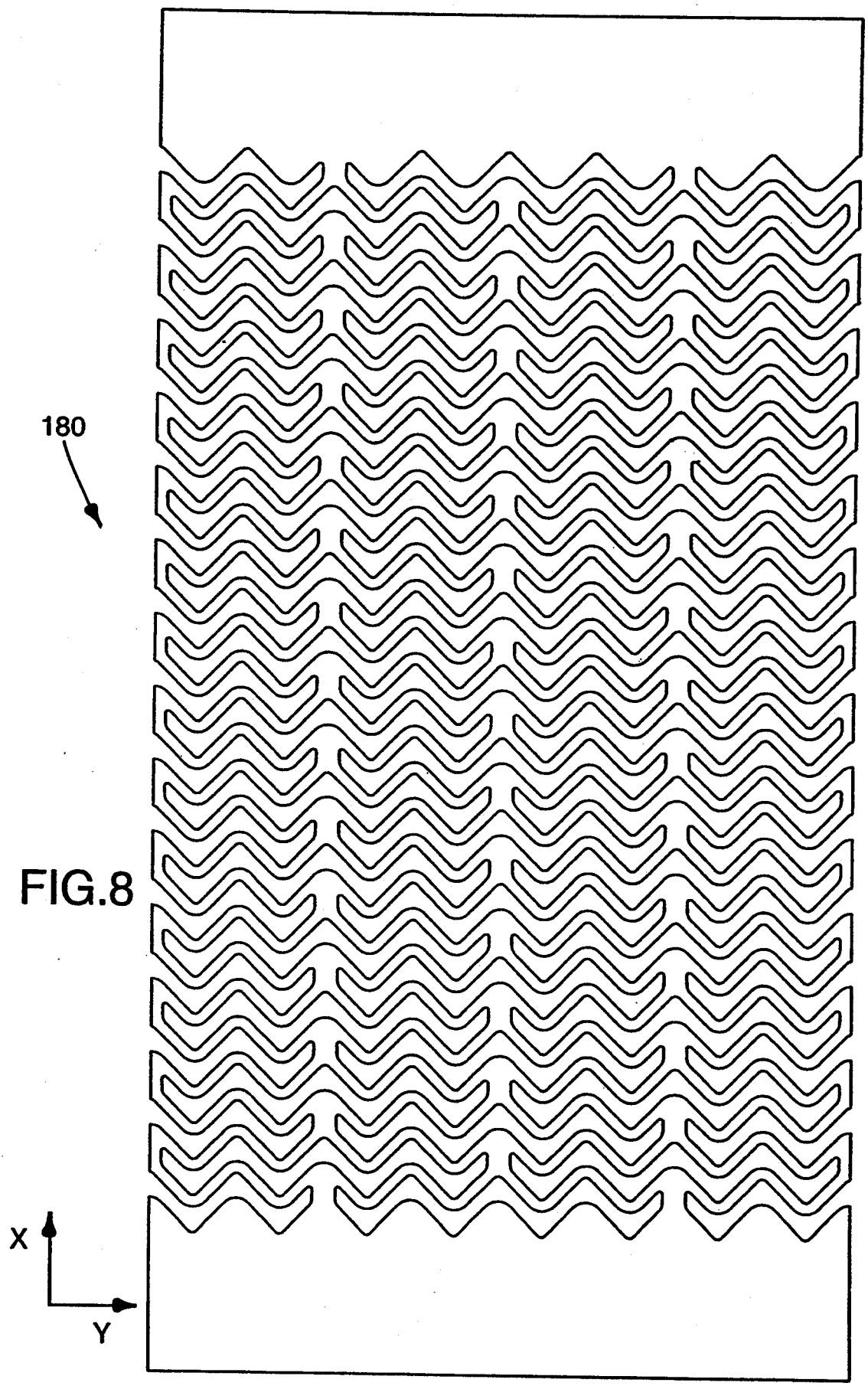
FIG. 8 is a top view of a sixth preferred electrical heating element configuration that is useful in making the electrically resistive tube employed in a diesel particulate filter cartridge according to the present invention.

| Configuration | Reaction force in direction of displacement N | Width of modeled section, mm | Circumferential stiffness, N/mm | Circumferential stiffness per unit area, (N/mm)/mm² | Percent circumferential stiffness of a hollow, solid tube, % |
| --- | --- | --- | --- | --- | --- |
| FIG. 1 | 76.111 | 2.667 | 599.29 | 491.48 | 31.8 |
| FIG. 2 | 1077.137 | 24.384 | 8481.39 | 760.77 | 49.2 |
| FIG. 3 | 127.164 | 24.392 | 1001.29 | 89.79 | 5.8 |
| FIG. 4 | 4.139 | 33.171 | 32.59 | 2.15 | 0.1 |
| FIG. 5 | 93.826 | 16.189 | 738.78 | 99.81 | 6.4 |
| FIG. 6 | 39.925 | 13.646 | 314.37 | 50.39 | 3.3 |
| FIG. 7 | 72.818 | 16.298 | 573.37 | 76.95 | 5 |
| FIG. 8 | 32.047 | 13.343 | 252.33 | 41.36 | 2.7 |
| Hollow, Solid Tube | 455.780 | 5.080 | 3588.81 | 1545.19 | 100 |

EXAMPLE 2
Comparative

This example illustrates the reduced tendency of a slotted electrically resistive heating element configuration (see FIG. 5) used in the diesel particulate filter cartridge according to the present invention to buckle as compared to a known electrically resistive heating element configuration (see FIG. 2).

Two Example 2 diesel particulate filter cartridges substantially as shown in FIG. 9 were constructed using a 29.2 cm long slotted nickel-chrome-iron alloy tubes having a 40 mm outside diameter. The tubes were formed from 0.46 mm thick nickel-chrome-iron alloy sheets (commercially available under the trade designation "INCONEL 600" from Inco Alloy International of Kokomo, Ind.) which was laser cut to provide the design depicted in FIG. 5. The laser cut sheets were rolled into a tubular shape and the side edges brought together to form the tube were welded together. The caps, plates, and annular rings were made of conventional 304 stainless steel.

Each tube was cross-wound with 2/2, 1.5 z, 1800-denier alumina-boria-silica ceramic yarn (commercially available under the trademarked designation "NEXTEL 312 CERAMIC YARN" from the 3M Company) which had been lightly texturized using an air jet texturizing machine (commercially available under the trade designation "MODEL 17 SIDEWINDER" with a "MODEL 52D JET" from Enterprise Machine and Development Corp. of New Castle, Del.). The speed of the texturizing machine was set at about 26.5 meters per minute. The jet was opened about ¾ of a turn from its most closed position. The air pressure was set at about 550 kPa.

Each tube was then cross-wound with seventeen layers 2/2, 1.5 z, 1800-denier alumina-boria-silica ceramic yarn ("NEXTEL 312 CERAMIC YARN") which had been air texturized as described above.

Specifically, the ceramic yarn was helically wound around the tube using a three-axis computer-controlled precision winding machine (Automation Dynamics of Signal Hills, Calif.). The winding angle for the first layer was 47°. During winding the yarn was kept at a constant tension of about 14.2 Newtons. For each successive layer, the winding angle was increased slightly so that the core of the yarn for each successive layer was aligned with the core of the yarn of the underlying core of yarn such that four-sided openings were provided.

At each imperforated area of the tube (i.e., at each end of the tube) the winding pattern was modified to have a 60° dwell providing dense end walls, which serves to block unfiltered exhaust gas escaping at the ends of the filter.

For the first layer of cross-wound yarn, the opening size between opposite corners of the "four-sided openings" was about 3.9 mm in the axial direction of the tube and about 6.7 mm in the circumferential direction of the tube. The opening size between the opposite corners of "four-sided openings" comprising the last (i.e., seventeenth) layer was about 4.8 mm in the axis direction and about 8 mm in the circumferential direction of the tube. There were 24 "four-sided" openings along a line in the axial direction of the tube.

The outside diameter of the tube having the helically cross-wound yarn thereon was about 65 mm. The seventeen layers of ceramic yarn weighed about 210 grams.

Two comparative diesel particulate filter cartridges (Comparative) were prepared as described for the Example 2 cartridges except the configuration of the tubular heating elements were as depicted in FIG. 2.

The four filter cartridges (i.e., the two Example 2 and the two Comparative cartridges) were mounted in a casing as shown in and described above for FIGS. 10 and 11. The casing, open support structure, and circular plate were made of conventional 304 stainless steel. A thermocouple was placed inside each heater to monitor the temperature. A conventional flow rotometer was attached to the conical inlet of the casing to regulate air flow to the cartridges between heatings. Each heater element consumed about 650 watts of power at 12 volts. The heating elements were repeatedly cycled from about 50° to about 950° C. by energizing each heater by applying 12 volts for about 300 seconds and turning off the power for about 300 seconds. When the power was turned off, air at ambient temperature was supplied to the cartridges at a rate of about 0.425–0.5 m³/min.

The resistance of each heating element and the number of cycles were monitored until failure of the heating element. Failure of the heating element was when the heating element became an open circuit. The results are provided in Table 2, below.

TABLE 2

| Example | Configuration | Resistance of heater, ohms | No. of cycles to failure |
|---|---|---|---|
| 2 | FIG. 5 | 0.281 | 8698 |
|   |        | 0.28  | 10646 |
| Comparative | FIG. 2 | 0.247 | 6654 |
|   |        | 0.245 | 8578 |

Almost all of the strands of the failed Comparative heaters were significantly radially buckled inward. By contrast, the strands of the failed Example 1 heaters did not significantly buckle. The tips of the v-slots of the Example 2 heater configuration were observed to have a slight inward radial deformation.

EXAMPLE 3

Four filter cartridges prepared as described in Example 2 were placed in the exhaust system of a 3.4 liter, six cylinder, four stroke, indirect injection diesel engine (commercially available under the trade designation "CUMMINS 6A3.4 DIESEL ENGINE" from Cummins Engine Co. of Columbus, Ohio). A conventional hydraulic load bank was attached to the torque shaft of the engine. The engine was run at about 1500 rpm with the hydraulic load bank set at 9653 kPa (1400 psi). The exhaust temperature of the engine was about 280° C.

The back pressure at the beginning of the test was about 2.5 cm of water (0.25 kPa). The engine was run for about 105 minutes, after which time the back pressure was about 152 cm of water (14.9 kPa).

Each filter cartridge was then energized for about 7.5 minutes by applying about 12 volts to provide 650 watts of power per cartridge. During regeneration, about 0.1 m³/min. of air was supplied to the cartridges to provide a sufficient amount of oxygen to complete the soot burning process. The pressure drop across the regenerated filter was about 7.6 cm of water (0.75 kPa).

The filter cartridge was again loaded by the exhaust system of the diesel engine and run for about 108 minutes until the back pressure was about 152 cm of water (14.9 kPa).

During this second run, the efficiency of the filter was measured when the back pressure across the loaded filter was about 76.2 cm of water (7.5 kPa). Specifically, the particle trapping efficiency of the filter was measured using conventional multiple batch filter sampling at the inlet (i.e., upstream) and outlet (i.e., downstream) of the filter, using the filter handling procedures outlined in 40 CFR § 86.1339-86 (1989). The membrane filters used were 47 mm in diameter (commercially available under the trademarked designation "PALL-FLEX TEFLON MEMBRANE FILTERS" from Pallflex Products Corp. of Putnam, Conn.).

To calculate the efficiency of the diesel particulate filter, the mass concentration of the downstream sample (i.e., the amount of soot in the downstream membrane filter divided by the volume of the sample) was divided by the mass concentration of the upstream sample (i.e., the amount of soot in the upstream membrane filter divided by the volume of the sample). This quotient was subtracted from unity and the result multiplied by 100.

The efficiency of the diesel particulate filter with a back pressure of about 76.2 cm of water (7.5 kPa), at an exhaust flow rate of about 4.1 m³/min, was about 84%. The efficiency of the filter with a back pressure of about 127 cm of water (11.2 kPa), at an exhaust flow rate of about 4.1 m³/min, was about 87%. After the engine was run for about 108 minutes, the back pressure was about 152 cm of water (14.9 kPa).

The filter cartridges were regenerated again as described above. The back pressure across the regenerated filter was about 5.1 cm of water (0.5 kPa).

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A diesel particulate filter cartridge comprising:
   (a) a substantially rigid, electrically resistive tube having two ends and an outer slotted surface having a plurality of slots, said electrically resistive tube having a length and a circumference, a current path length across said length of said electrically resistive tube which is longer than said length of said electrically resistive tube, and current path lengths around said circumference having portions bounded on opposite sides by slots, wherein all of said current path lengths having the bounded portions are greater in length than said circumference, wherein said substantially rigid, electrically resistive tube has circumferential stiffness that is less than 40 percent of the circumferential stiffness of a comparable electrically resistive hollow, solid tube, and wherein said electrically resistive tube is not expanded metal;
   (b) a filtering element comprising inorganic fiber covering said outer slotted surface of said electrically resistive tube; and
   (c) means attached to said electrically resistive tube for applying a voltage across said electrically resistive tube to heat it above the combustion point of entrapped diesel exhaust particulate, said electrically resistive tube being positioned such that when a voltage is applied across said electrically resistive tube, sufficient heat is transferred from said electrically resistive tube to said filtering element to burn off entrapped diesel exhaust particulate.

2. The diesel particulate filter cartridge according to claim 1 wherein said electrically resistive tube is made of metal and said inorganic fiber is a ceramic.

3. The diesel particulate filter cartridge according to claim 2 wherein said current path length across said length of said electrically resistive tube is at least 1.1 times said length of said electrically resistive tube, and wherein all of said current path lengths having the bounded portions are at least 1.1 times said circumference of said electrically resistive tube.

4. The diesel particulate filter cartridge according to claim 2 wherein said substantially rigid, electrically resistive tube has a circumferential stiffness that is less than about 25 percent of the circumferential stiffness of a comparable electrically resistive hollow, solid tube.

5. The diesel particulate filter cartridge according to claim 4 wherein said ceramic fiber is in the form of material selected from the group consisting of helically wound ceramic yarn, a woven fabric comprising ceramic yarn, a nonwoven mat comprising ceramic yarn, and combinations thereof.

6. The diesel particulate filter cartridge according to claim 4 wherein said inorganic fiber is in the form of ceramic yarn, wherein said ceramic yarn is substantially helically cross-wound around said substantially rigid, electrically resistive tube to cover said slotted outer surface, wherein said ceramic yarn comprises a core from which at least one of loops of continuous fibers or fiber segments extend outwardly, wherein said cores of successive convolutions of each successive layer are radially aligned to provide walls that are spaced to define four-sided openings, said walls providing stabilization to said filtering element against exhaust forces, and wherein said at least one of loops of fibers or fiber segments project into each of said openings, with said at least one of loops of fibers or fiber segments of adjacent convolutions being intermeshed to provide with each of said openings a trap for diesel exhaust particulates, and wherein said slotted electrically resistive tube has an imperforate area at each end thereof, and said cores of adjacent convolutions of said yarn at said imperforate areas are spaced closely to provide end walls.

7. The diesel particulate filter cartridge according to claim 6 wherein said cores of successive convolutions are laterally offset relative to each adjacent one to deflect the generally radial exhaust flow into tortuous paths.

8. The diesel particulate filter cartridge according to claim 6 wherein said filtering element has an upstream region and a downstream region, wherein the amount of said at least one of fiber loops or fiber segments is greater in said downstream region than in said upstream region, said upstream region being positioned such that exhaust gases pass therethrough prior to passing through said downstream region.

9. The diesel particulate filter cartridge according to claim 4 wherein said filter element comprises fabric comprising an unknotted weave of (a) flexible, substantially incompressible, substantially uncrimped, spaced support strands and (b) flexible, lofty, substantially fully crimped fill yarns which are pulled tightly against said support strands.

10. The diesel particulate filter cartridge according to claim 4 further comprising means for supporting said diesel particulate filter cartridge in a casing.

11. The diesel particulate filter cartridge according to claim 2 wherein said substantially rigid, electrically resistive tube has a circumferential stiffness that is less than about 10 percent of the circumferential stiffness of a comparable electrically resistive hollow, solid tube.

12. The diesel particulate filter cartridge according to claim 2 wherein said substantially rigid, electrically resistive tube has a circumferential stiffness that is less than about 5 percent of the circumferential stiffness of a comparable electrically resistive hollow, solid tube.

13. The diesel particulate filter cartridge according to claim 2 wherein said substantially rigid, electrically resistive tube has a circumferential stiffness that is less than about 3 percent of the circumferential stiffness of a comparable electrically resistive hollow, solid tube.

14. The diesel particulate filter cartridge according to claim 1 wherein said electrically resistive tube is configured to have, when energized, a power concentration in the range from about 1 to about 7 watts/cm$^2$.

15. The diesel particulate filter cartridge according to claim 1 wherein one of said ends of said electrically resistive tube is blocked.

16. A diesel particulate filter comprising
(a) a casing having at least two ends;
(b) means for connecting said at least two ends of said casing to an exhaust system;
(c) means for supporting at least one diesel particulate filter cartridge; and
(d) at least one diesel particulate filter cartridge comprising
  (A) a substantially rigid, electrically resistive tube having two ends and an outer slotted surface having a plurality of slots, one of said ends of said electrical resistive tube being blocked, said electrically resistive tube having a length and a circumference, a current path length across said length of said electrically resistive tube which is longer than said length of said electrically resistive tube, and current path lengths around said circumference having portions bounded on opposite sides by slots, wherein all of said current path lengths having the bounded portions are greater in length than said circumference, wherein said substantially rigid, electrically resistive tube has circumferential stiffness that is less than 40 percent of the circumferential stiffness of a comparable electrically resistive hollow, solid tube, and wherein said electrically resistive tube is not expanded metal;
  (B) a filtering element comprising inorganic fiber covering said outer slotted surface of said electrically resistive tube; and
  (C) means for applying a voltage across said electrically resistive tube to heat it above the combustion point of entrapped diesel exhaust particulate,
said electrically resistive tube being positioned such that when a voltage is applied across said electrically resistive tube, sufficient heat is transferred from said electrically resistive tube to said filtering element to burn off entrapped diesel exhaust particulate,
wherein said two ends of said electrically resistive tube extend between said at least two ends of said casing and wherein said at least one diesel particulate filter cartridge is supported in said casing by said supporting means.

17. The diesel particulate filter according to claim 16 wherein said electrically resistive tube is configured to have, when energized, a power concentration in the range from about 1 to about 7 watts/cm$^2$.

18. A diesel particulate filter cartridge comprising:
(a) a substantially rigid, hollow, tubular support member having an outer surface with openings extending from said outer surface to an inner surface and two ends;
(b) a filtering element comprising inorganic fiber covering said openings of said outer surface of said substantially rigid, hollow, tubular support member, said filtering element having an outer surface;
(c) a slotted electrically resistive tube, said slotted electrically resistive tube having a plurality of slots, an inner surface, a length, and a circumference, a current path length across said length of said slotted electrically resistive tube which is longer than said length of said slotted electrically resistive tube, and current path lengths around said circumference having portions bounded on opposite sides by slots, wherein all of said current path lengths having the bounded portions are greater in length than said circumference, wherein said substantially rigid, electrically resistive tube has circumferential stiffness that is less than 40 percent of the circumferential stiffness of a comparable electrically resistive hollow, solid tube, and wherein said electrically resistive tube is not expanded metal; and (d) means attached to said electrically resistive tube for applying a voltage across said slotted electrically resistive tube to heat it above the combustion point of entrapped diesel exhaust particulate, said electrically resistive tube being positioned with said inner surface of said electrically resistive tube over said outer surface of said filtering element such that when a voltage is applied across said electrically resistive tube, sufficient heat is transferred from said electrically resistive tube to said filtering element to burn off entrappad diesel exhaust particulate.

19. The diesel particulate filter cartridge according to claim 18 wherein said electrically resistive tube is made of metal and said inorganic fiber is a ceramic.

20. The diesel particulate filter cartridge according to claim 19 wherein said current path length across said length of said electrically resistive tube is at least 1.1 times said length of said electrically resistive tube, and wherein all of said current path lengths having the bounded portions are at least 1.1 times said circumference of said electrically resistive tube.

21. The diesel particulate filter cartridge according to claim 19 wherein said substantially rigid, electrically resistive tube has a circumferential stiffness that is less than about 25 percent of the circumferential stiffness of a comparable electrically resistive hollow, solid tube.

22. The diesel particulate filter cartridge according to claim 21 wherein said ceramic fiber is in the form of material selected from the group consisting of helically wound ceramic yarn, a woven fabric comprising ceramic yarn, a nonwoven mat comprising ceramic yarn, and combinations thereof.

23. The diesel particulate filter cartridge according to claim 21 wherein said inorganic fiber is in the form of ceramic yarn, wherein said ceramic yarn is substantially helically cross-wound around said substantially rigid, hollow, tubular support member to cover said openings in said outer surface, wherein said ceramic yarn comprises a core from which at least one of loops of continuous fibers or fiber segments extend outwardly, wherein said cores of successive convolutions of each successive layer are radially aligned to provide walls that are spaced to define four-sided openings, said walls providing stabilization to said filtering element against exhaust forces, and wherein said at least one of loops of fibers or fiber segments project into each of said openings, with said at least one of loops of fibers or fiber segments of adjacent convolutions being intermeshed to provide with each of said openings a trap for diesel exhaust particulates, and wherein said slotted electrically resistive tube has an imperforate area at each end thereof, and said cores of adjacent convolutions of said yarn at said imperforate areas are spaced closely to provide end walls.

24. The diesel particulate filter cartridge according to claim 23 wherein said cores of successive convolutions are laterally offset relative to each adjacent one to deflect the generally radial exhaust flow into tortuous paths.

25. The diesel particulate filter cartridge according to claim 23 wherein said filtering element has an upstream region and a downstream region, wherein the amount of said at least one of fiber loops or fiber segments is greater in said downstream region than in said upstream region, said upstream region being positioned such that exhaust gases pass therethrough prior to passing through said downstream region.

26. The diesel particulate filter cartridge according to claim 21 wherein said filter element comprises fabric comprises an unknotted weave of (a) flexible, substantially incompressible, substantially uncrimped, spaced support strands and (b) flexible, lofty, substantially fully crimped fill yarns which are pulled tightly against said support strands.

27. The diesel particulate filter cartridge according to claim 20 wherein said substantially rigid, electrically resistive tube has a circumferential stiffness that is less than about 10 percent of the circumferential stiffness of a comparable electrically resistive hollow, solid tube.

28. The diesel particulate filter cartridge according to claim 20 wherein said substantially rigid, electrically resistive tube has a circumferential stiffness that is less than about 5 percent of the circumferential stiffness of a comparable electrically resistive hollow, solid tube.

29. The diesel particulate filter cartridge according to claim 20 wherein said substantially rigid, electrically resistive tube has a circumferential stiffness that is less than about 3 percent of the circumferential stiffness of a comparable electrically resistive hollow, solid tube.

30. The diesel particulate filter cartridge according to claim 20 wherein said slotted electrically resistive tube is sandwiched within said filter element.

31. The diesel particulate filter cartridge according to claim 20 wherein filter element has an exterior surface and said slotted electrically resistive tube covers said exterior surface of said filter element.

32. The diesel particulate filter cartridge according to claim 20 further comprising means for supporting said diesel particulate filter cartridge in a casing.

33. The diesel particulate filter cartridge according to claim 18 wherein said electrically resistive tube is configured to have, when energized, a power concentration in the range from about 1 to about 7 watts/cm$^2$.

34. The diesel particulate filter according to claim 18 where one of said ends of said support member is blocked.

35. A diesel particulate filter comprising:
(a) a casing having at least two ends;
(b) means for connecting said at least two ends of said casing to an exhaust system;
(c) means for supporting at least one diesel particulate filter cartridge; and
(d) at least one diesel particulate filter cartridge comprising
(A) a substantially rigid, hollow, tubular support member having an outer surface with openings extending from said outer surface to an inner surface and two ends, one end of said support member being blocked;
(B) a filtering element comprising inorganic fiber covering said openings of said outer surface of said substantially rigid, hollow, tubular support member, said filtering element having an outer surface;
(C) a slotted electrically resistive tube, said slotted electrically resistive tube having a plurality of slots, an inner surface, a length, and a circumference, a current path length across said length of said slotted electrically resistive tube which is longer than said length of said slotted electrically resistive tube, and current path lengths around said circumference having portions bounded on opposite sides by slots, wherein all of said current path lengths having the bounded portions are greater in length than said circumference, wherein said substantially rigid, electrically resistive tube has circumferential stiffness that is less than 40 percent of the circumferential stiffness of a comparable electrically resistive hollow, solid tube, and wherein said electrically resistive tube is not expanded metal; and (D) means for applying a voltage across said slotted electrically resistive tube to heat it above the combustion point of entrapped diesel exhaust particulate, said electrically resistive tube being positioned with said inner surface of said electrically resistive tube over said outer surface of said filtering element such that when a voltage is applied across said electrically resistive tube, sufficient heat is transferred from said electrically resistive tube to said filtering element to burn off entrapped diesel exhaust particulate, wherein said two ends of said hollow, tubular support member extend between said at least two ends of said casing and is supported in said casing by said means for supporting.

36. The diesel particulate filter according to claim 35 wherein said electrically resistive tube is configured to have, when energized, a power concentration in the range from about 1 to about 7 watts/cm$^2$.

* * * * *

UNITED STATES PATENT AND TRADEMARK OFFICE
CERTIFICATE OF CORRECTION

PATENT NO.: 5,409,669

DATED: April 25, 1995

INVENTOR(S): Smith et al.

It is certified that error appears in the above-identified patent and that said Letters Patent is hereby corrected as shown below:

Title page;
under U.S. PATENT DOCUMENTS, the following reference should be added:

4,516,108   5/1985   Buguet et al.....................338/319

Title page;
under FOREIGN PATENT DOCUMENTS, the following reference should be added:

1216381   11/1959   France.......................H05b

Col. 9, line 40, "84" should be --89--.

Signed and Sealed this

Thirtieth Day of July, 1996

Attest:

BRUCE LEHMAN

*Attesting Officer*            *Commissioner of Patents and Trademarks*